(12) United States Patent
Brucker et al.

(10) Patent No.: US 12,181,366 B2
(45) Date of Patent: *Dec. 31, 2024

(54) THERMAL CONDUCTIVITY GAUGE

(71) Applicant: MKS Instruments, Inc., Andover, MA (US)

(72) Inventors: Gerardo A. Brucker, Longmont, CO (US); Timothy C. Swinney, Fort Collins, CO (US)

(73) Assignee: MKS INSTRUMENTS, INC., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/583,344

(22) Filed: Feb. 21, 2024

(65) Prior Publication Data

US 2024/0201035 A1 Jun. 20, 2024

Related U.S. Application Data

(63) Continuation of application No. 18/303,222, filed on Apr. 19, 2023, now Pat. No. 11,946,823, which is a
(Continued)

(51) Int. Cl.
*G01L 9/02* (2006.01)
*G01L 9/00* (2006.01)
(Continued)

(52) U.S. Cl.
CPC ............... *G01L 9/025* (2013.01); *G01L 9/00* (2013.01); *G01L 9/0002* (2013.01); *G01L 21/10* (2013.01); *G01L 21/14* (2013.01)

(58) Field of Classification Search
CPC ......... G01L 9/025; G01L 9/00; G01L 9/0002; G01L 21/10; G01L 21/14; G01L 21/12; G01L 9/065; G01L 9/045
See application file for complete search history.

(56) References Cited

U.S. PATENT DOCUMENTS

| | | |
|---|---|---|
| 4,755,669 A | 7/1988 | Grant et al. |
| 4,765,188 A | 8/1988 | Krechmery et al. |
| (Continued) | | |

FOREIGN PATENT DOCUMENTS

| | | |
|---|---|---|
| CN | 1326544 A | 12/2001 |
| CN | 1969175 A | 5/2007 |
| (Continued) | | |

OTHER PUBLICATIONS

International Search Report and Written Opinion for Int'l Application No. PCT/US2019/019368 dated May 23, 2019.
(Continued)

*Primary Examiner* — Peter J Macchiarolo
*Assistant Examiner* — Anthony W Megna Fuentes
(74) *Attorney, Agent, or Firm* — Hamilton, Brook, Smith & Reynolds, P.C.

(57) ABSTRACT

A thermal conductivity gauge measures gas pressure within a chamber. A sensor wire and a resistor form a circuit coupled between a power input and ground, where the sensor wire extends into the chamber and connects to the resistor via a terminal. A controller adjusts the power input, as a function of a voltage at the terminal and a voltage at the power input, to bring the sensor wire to a target temperature. Based on the adjusted power input, the controller can determine a measure of the gas pressure within the chamber.

16 Claims, 21 Drawing Sheets

Related U.S. Application Data continuation of application No. 16/953,923, filed on Nov. 20, 2020, now Pat. No. 11,656,139, which is a continuation of application No. 15/955,266, filed on Apr. 17, 2018, now Pat. No. 10,845,263.

(51) Int. Cl.
  *G01L 21/10* (2006.01)
  *G01L 21/12* (2006.01)
  *G01L 21/14* (2006.01)

(56) References Cited

U.S. PATENT DOCUMENTS

| | | |
|---|---|---|
| 5,079,954 A | 1/1992 | O'Neal, III |
| 5,475,623 A | 12/1995 | Stocker |
| 5,557,972 A | 9/1996 | Jacobs et al. |
| 5,608,168 A | 3/1997 | Schoroth |
| 5,668,320 A | 9/1997 | Cowan |
| 5,693,888 A | 12/1997 | Enderes et al. |
| 6,023,979 A | 2/2000 | Bills et al. |
| 6,973,834 B1 | 12/2005 | Golan |
| 7,207,224 B2 | 4/2007 | Rutt et al. |
| 7,331,237 B2 | 2/2008 | Borenstein |
| 7,456,634 B2 | 11/2008 | Knott |
| 7,613,586 B2 | 11/2009 | Higashi |
| 8,171,801 B2 | 5/2012 | Le et al. |
| 8,893,554 B2 | 11/2014 | Stambaugh |
| 9,335,231 B2 | 5/2016 | Gu et al. |
| 9,970,838 B2 | 5/2018 | Minami |
| 10,753,816 B2 | 8/2020 | Kornelsen et al. |
| 10,845,263 B2 | 11/2020 | Brucker et al. |
| 11,656,139 B2 | 5/2023 | Brucker et al. |
| 11,946,823 B2 | 4/2024 | Brucker et al. |
| 2002/0163345 A1 | 11/2002 | Jeong et al. |
| 2008/0000530 A1 | 1/2008 | Sun et al. |
| 2008/0115585 A1 | 5/2008 | Miyashita et al. |
| 2009/0056464 A1 | 3/2009 | Qader et al. |
| 2009/0199649 A1 | 8/2009 | Kawasaki |
| 2010/0034236 A1 | 2/2010 | Ploechinger |
| 2010/0132475 A1 | 6/2010 | Kawasaki |
| 2014/0001578 A1 | 1/2014 | Walchli et al. |
| 2016/0178420 A1 | 6/2016 | Sasaki |
| 2016/0313164 A1 | 10/2016 | Schneider et al. |
| 2019/0316981 A1 | 10/2019 | Brucker et al. |
| 2021/0208016 A1 | 7/2021 | Brucker et al. |
| 2023/0366763 A1 | 11/2023 | Brucker et al. |

FOREIGN PATENT DOCUMENTS

| | | |
|---|---|---|
| CN | 101568817 A | 10/2009 |
| CN | 101588117 A | 11/2009 |
| CN | 203011621 U | 6/2013 |
| CN | 105814414 A | 7/2016 |
| CN | 107894300 A | 4/2018 |
| DE | 202014007298 U1 | 12/2015 |
| EP | 2120031 A1 | 11/2009 |
| TW | 200813682 A | 3/2008 |
| WO | 00/54018 A1 | 9/2000 |
| WO | 2007/017625 A1 | 2/2007 |
| WO | 2019/203929 A1 | 10/2019 |

OTHER PUBLICATIONS

Southard, A. et al., "Fast Pressure Prediction with a MEMS Pirani Sensor for Protection of MOMA-MS", HEMS Workshop Sep. 13-16, 2015.

THERMAL CONDUCTIVITY GAUGE

RELATED APPLICATION

This application is a continuation of U.S. application Ser. No. 18/303,222, filed Apr. 19, 2023, which is a continuation of U.S. application Ser. No. 16/953,923, filed Nov. 20, 2020, now U.S. Pat. No. 11,656,139, issued May 23, 2023, which is a continuation of U.S. application Ser. No. 15/955,266, filed Apr. 17, 2018, now U.S. Pat. No. 10,845,263 issued Nov. 24, 2020. The entire teachings of the above applications is incorporated herein by reference.

BACKGROUND

Because the rate of heat transfer through a gas is a function of the gas pressure, under certain conditions, measurements of heat transfer rates from a heated sensing element to the gas can, with appropriate calibration, be used to determine the gas pressure. This principle is used in the well-known Pirani gauge, in which heat loss is measured with a Wheatstone bridge network, which serves both to heat the sensing element and to measure its resistance. In a Pirani gauge, a temperature-sensitive resistance is connected as one arm of a Wheatstone bridge. The temperature-sensitive resistance is exposed to the vacuum environment whose pressure is to be measured.

A conventional Pirani gauge is calibrated against several known pressures to determine a relationship between pressure of a gas and the power loss to the gas or the bridge voltage. Then, assuming end losses and radiation losses remain constant, the unknown pressure of a gas may be directly determined by the power lost to the gas or related to the bridge voltage at bridge balance.

SUMMARY

Example embodiments include a thermal conductivity gauge for measuring gas pressure. The gauge may include a sensor wire, a resistor, and a controller. The sensor wire may be positioned within a chamber and coupled to a terminal and a ground. The resistor may be coupled between the terminal and a power input. The controller may be configured to apply the power input to the resistor and adjust the power input, as a function of a voltage at the terminal and a voltage at the power input, to bring the sensor wire to a target temperature. The controller may further determine a measure of gas pressure within the chamber based on the adjusted power input.

In further embodiments, the resistor and sensor wire may have an equivalent resistance at the target temperature. The sensor wire may be coupled to a grounded envelope encompassing a volume of the chamber. The sensor wire may be coupled to the envelope via a shield extending through the volume of the chamber. The controller may be further configured to 1) determine a compensation factor based on an envelope temperature external to the chamber, and 2) determine the measure of gas pressure as a function of the compensation factor. The resistor may be a first resistor, and a second resistor and a switch can be connected in parallel with the first resistor, where the controller selectively enables the switch.

In still further embodiments, the gauge may be implemented in combination with an ion gauge (e.g., a hot cathode gauge or a cold cathode gauge) within the chamber. Feedthroughs of the gauge and the ion gauge extend through a common feedthrough flange. The gauge occupies a single feedthrough of the feedthrough flange, where the terminal is the single feedthrough. The controller can selectively enable the ion gauge in response to detecting the measure of gas pressure from the thermal conductively gauge below a target threshold. The controller may be further configured to determine a compensation factor based on heat generated by the ion gauge, the controller determining the measure of gas pressure as a function of the compensation factor. The controller may selectively disables the ion gauge in response to detecting the measure of gas pressure from the thermal conductively gauge above a target threshold.

In yet further embodiments, the sensor wire is supported within a removable housing extending between the terminal and the ground.

Further embodiments can include a method of measuring gas pressure. A power input can be applied through a resistor and sensor wire connected in series, where the sensor wire is coupled to a terminal and a ground within a chamber, and the resistor is coupled between the terminal and a power input. The power input can be adjusted, as a function of a voltage at the terminal and a voltage at the power input, to bring the sensor wire to a target temperature. A measure of gas pressure can then be determined within the chamber based on the adjusted power input.

Still further embodiments can include a thermal conductivity gauge for measuring gas pressure, including a circuit and a controller. The circuit includes a sensor wire and a resistor coupled in series, the sensor wire being positioned within a chamber. The controller may be configured to 1) apply a power input to the circuit; 2) adjust the power input, as a function of a voltage across one of the sensor wire and the resistor, to bring the sensor wire to a target temperature; and 3) determine a measure of gas pressure within the chamber based on the adjusted power input.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Pirani sensors with constant sensor wire temperature have been employed to perform pressure measurements between 1E-4 and 1000 Torr. Typical Pirani gauges that provide a constant sensor wire temperature during operation rely on a Wheatstone bridge in connection with the sensor wire. The electrical power required to keep the wire at a constant temperature is used to provide a measure of pressure. Maintaining a constant temperature at the sensor wire is desirable as it allows faster response to pressure steps as there is no need to wait for temperature changes to take place. Also, having constant wire temperature provides pressure independent signal baseline offsets that can be subtracted from the actual signal to provide the pure pressure dependent part of the signal by itself.

In a typical constant wire temperature Pirani gauge, the temperature of a wire is kept at a constant temperature by running pressure dependent electrical heating power through it. Since the amount of electrical power needed to keep the wire at a constant temperature depends on pressure, a simple power measurement is used to provide a pressure measurement. This design relies on a Wheatstone bridge to regulate wire temperature by maintaining its temperature dependent resistance during operation.

Figure 1A:
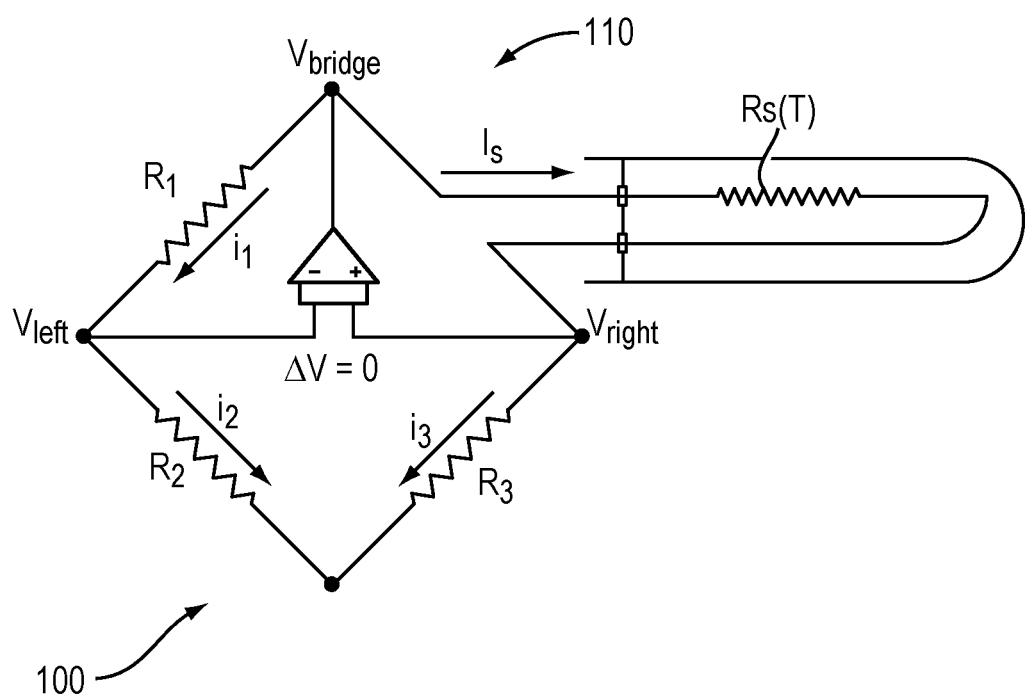
FIG. 1A is a circuit diagram of a prior art Pirani gauge.

FIG. 1A is a circuit diagram of a prior art Pirani gauge 100. The pressure sensor comprises a temperature sensitive resistance Rs connected as one arm of a Wheatstone bridge 110. $R_3$ is typically a temperature sensitive resistance designed to have a negligible temperature rise due to the current $i_3$. $R_2$ and $R_1$ are typically fixed resistances. The sensor wire $R_s$ and typically $R_3$ are exposed to the environment whose pressure is to be measured. The environment is encompassed within an envelope through which the sensor wire $R_s$ extends via a pair of feedthroughs. Alternatively, $R_3$ may also be included within the envelope via an additional one or more feedthroughs.

The resistance values of resistors $R_1$, $R_2$ and $R_3$ are selected such that when a pressure-dependent voltage $V_{Bridge}$ is applied to the top of the bridge, at which $V_{left}=V_{right}$, the resistance of the sensor wire $R_s$ is fixed and identical to $(R_1 * R_3)/R_2$. Voltage $V_{Bridge}$ is automatically controlled by an operational amplifier to maintain the voltage difference between $V_{left}$ and $V_{right}$ at zero volts. When the potential drop from $V_{left}$ to $V_{right}$ is zero, the bridge is considered to be balanced. At bridge balance, the following conditions exist:

$i_s=i_3$, (1)
$i_1=i_2$, (2)
$i_s R_s=i_1 R_1$, (3)
$i_2 R_2=i_3 R_3$ (4)

Dividing Eq. 3 by Eq. 4 and using Eq. 1 and 2 gives $R_s=\beta R_3$ (5) where ⊠ ⊠ $\beta=R_1 R_2$ (6)

Thus, at bridge balance, $R_s$ is a constant fraction $\beta$ of $R_3$.

To achieve a steady-state condition in Rs at any given pressure, Eq. 7 below must be satisfied:

Electrical power input to $R_s$=Power radiated by $R_s$+Power lost out ends of $R_s$+Power lost to gas by $R_s$ (7)

Figure 1B:
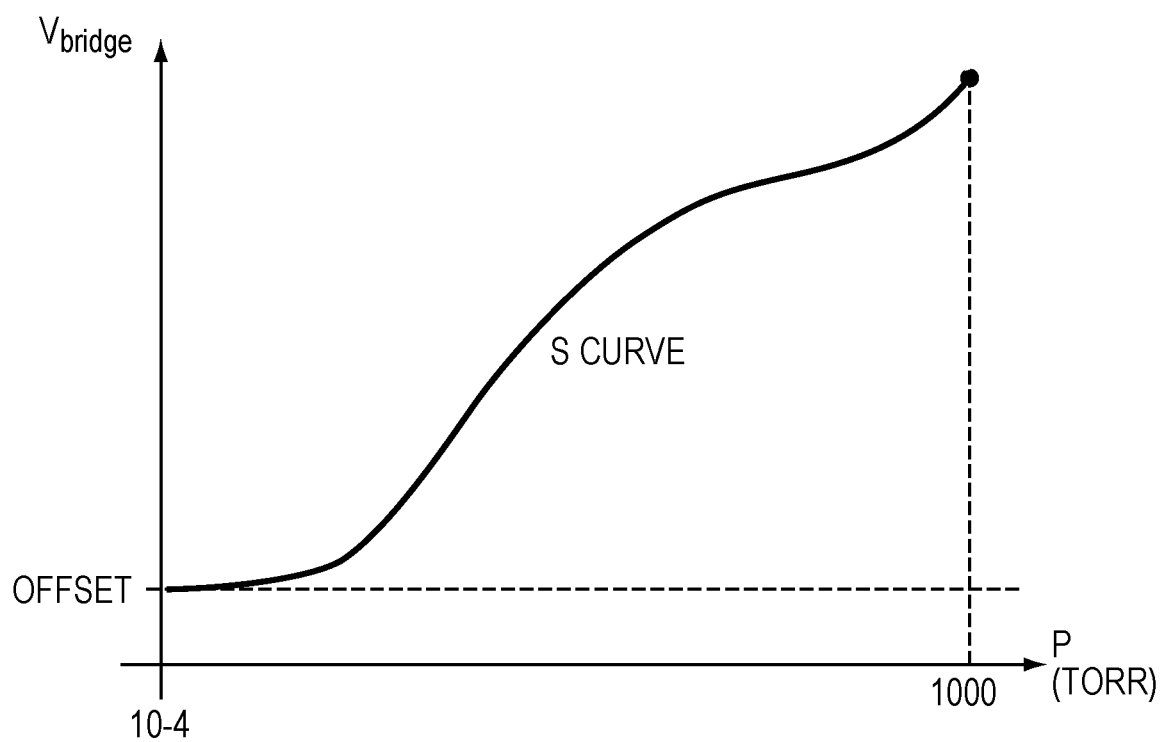
FIG. 1B is a graph illustrating a response of the Pirani gauge of FIG. 1A.

Because the amount of electrical power required to keep the sensor resistor $R_s$ at a constant temperature and a constant resistance increases with pressure, voltage $V_{bridge}$ depends on pressure as well. This relationship is illustrated in FIG. 1B, which is an example plot of voltage $V_{bridge}$ over a range of pressure within a chamber occupied by $R_s$. As shown, the voltage $V_{bridge}$ exhibits an S-curve over the pressure range. A conventional Pirani gauge is calibrated against several known pressures to determine a relationship between unknown pressure, $P_x$, and the power loss to the gas or more conveniently to the bridge voltage. Then, assuming end losses and radiation losses remain constant, the unknown pressure of the gas $P_x$ may be directly determined by the power lost to the gas or related to the bridge voltage at bridge balance.

The Pirani gauge 100 provides a simple configuration for measuring pressure, and allows for adjusting a sensor wire resistance in a simple manner. A simple op-amp circuit can be used to null the bridge ($V_{left}=V_{right}$), allowing the circuit to be built at a low cost. However, in order to provide compensation for different ambient temperatures outside the chamber, resistors of highly specific values must be added to the gauge head during calibration to provide the desired signal response (i.e., $V_{bridge}$ versus pressure) and proper temperature dependence.

Figure 2B:
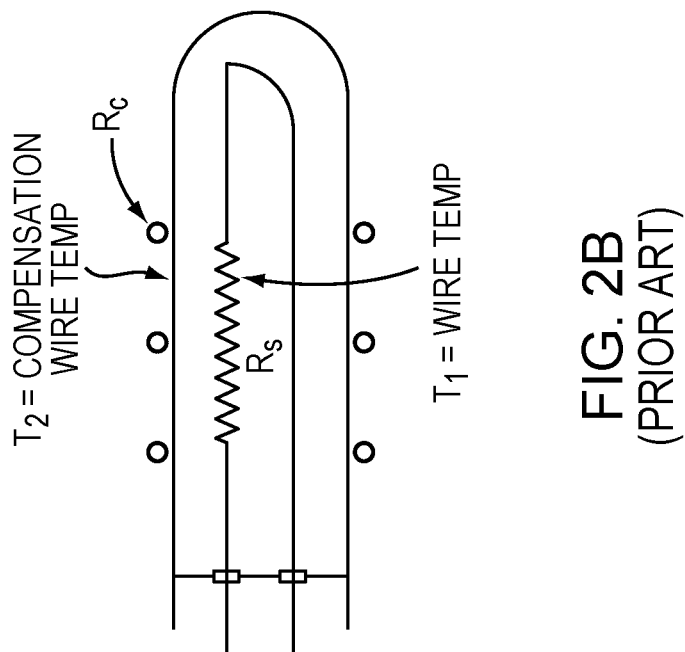
FIGS. 2A-B illustrate a prior art Pirani gauge including a compensation wire.
Figure 2A:
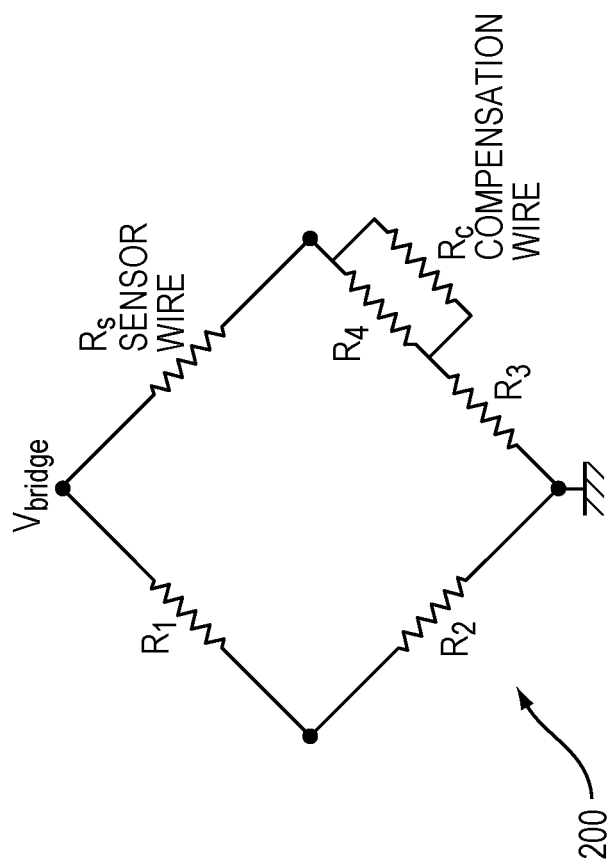

FIGS. 2A-B illustrate a prior art Pirani gauge 200 including a compensation wire Rc. The gauge 200 is comparable to the Pirani gauge 100 described above, but the addition of the compensation wire Rc allows the gauge 200 to compensate pressure readings against ambient temperature fluctuations. Such ambient temperature fluctuations change the difference in temperature between the sensor wire $R_s$ and the envelope walls (not shown) encompassing the chamber in which the pressure is to be measured. As shown in FIG. 2B, the compensation wire resistor $R_c$ is wound around a smaller envelope within the chamber and allowed to reach a temperature $T_2$ having thermal equilibrium with room temperature. The resistances in the bridge ($R_3$ and $R_4$) and in the compensation wire Rc are then tuned such that as $T_2$ changes, and while the Wheatstone bridge remains balanced, the difference in temperature $T_1$-$T_2$ (where $T_1$ is the wire temperature of the sensor $R_s$) remains constant. Because the power dissipated by the sensor wire $R_s$ to the gas depends on this temperature difference, a measurement of this power dissipation indicates a pressure measurement that is independent of ambient temperature.

In practice, the compensation wire $R_c$ exhibits variability among different gauges. Thus, each implementation of the gauge 200 must be individually tuned by adjusting resistance values during testing and calibration to provide a temperature difference ($T_1$-$T_2$) that remains constant as the ambient temperature changes. Further, the winding of the compensation wire $R_c$ can be expensive and difficult to complete. In order to provide fast response, the compensation wire $R_c$ can also be wound internally to the gauge in a thin walled envelope and become exposed to the gas environment.

Figure 3:
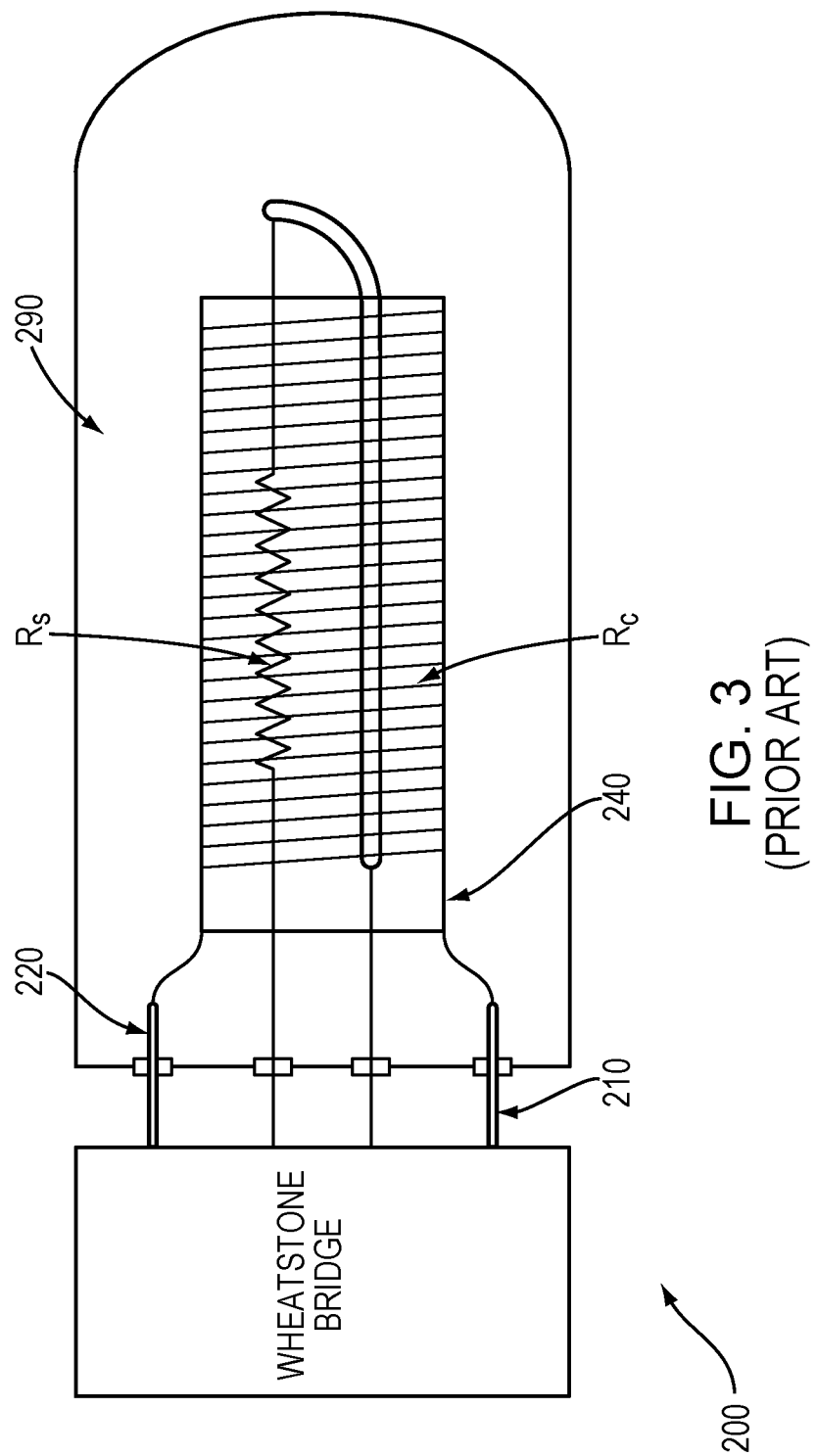
FIG. 3 illustrates the prior art Pirani gauge of FIGS. 2A-B implemented within a chamber.

FIG. 3 illustrates the prior art Pirani gauge 200, described above, in a further view as implemented within a chamber 290 (not shown to scale). A portion of the gauge 200, including the sensor wire $R_s$ and the compensation wire $R_c$, extends into a chamber 290 via a feedthrough flange 220, while the remainder of the Wheatstone bridge remains outside the chamber 290. The compensation wire $R_c$ is mounted inside the pressure sensor volume on a thin-walled can 240 that facilitates stabilization of the compensation wire $R_c$ while the room temperature changes. The gauge 200 requires a minimum of four feedthroughs 210 through the feedthrough flange: two feedthroughs connect the sensor wire $R_s$, and another two feedthroughs connect the compensation wire $R_c$.

The Pirani gauge 200 exhibits several disadvantages. In particular, both assembly and calibration of the gauge 200 can be difficult and laborious. In order to assemble and operate the gauge 200, the compensation wire $R_c$ must be wound and attached to electrical connectors at the feedthrough flange 220. Once assembled, the gauge 200 must undergo calibration for proper temperature compensation, including selecting the proper resistor values and ensuring that the value $T_1$-$T_2$ remains constant regardless of the room temperature. The Wheatstone bridge requires fine tuning for temperature compensation. Maintaining the value $T_1$-$T_2$ can be achieved if the calibration procedure is properly executed, but it does not allow the use of nominal resistor values. Rather, each gauge must be manually tuned, and is configured with specific resistors that are high-accuracy components.

Further, the sensor of the gauge 200, including the sensor wire $R_s$ and can 240, is large and bulky. In order to achieve convection at high pressures, the can 240 must have a large volume to allow convection to set in as pressure goes above approximately 100 torr. One reason for this requirement is that the sensor wire $R_s$ is not wound or coiled, and the can 240 has a large inner diameter.

A Pirani gauge may be useful a sensor to control enabling and disabling of an ionization gauge (not shown). However, due to its size and use of multiple feedthroughs, the gauge 200 may be unsuitable for use in combination with an ionization gauge. An ionization gauge occupies several feedthroughs and substantial volume adjacent to a feedthrough flange, leaving minimal space and feedthroughs for a Pirani gauge. Moreover, temperature compensation is generally required to run a Pirani gauge inside the envelope of an ionization gauge. As the ionization gauge is turned on, the walls of the ionization gauge envelope warm up, making it necessary to add temperature compensation as the difference between $T_1$ and $T_2$ changes due to an increasing $T_2$. The use of an internal compensation wire requires feedthroughs, while the addition of an external compensation wire adds complexity to the design.

Due to the rigid implementation of temperature control based on a Wheatstone bridge, the gauge 200 does not allow for a change of the sensor wire operational temperature (or resistance) during operation, instead providing a single temperature of operation.

Even though there is a linear relationship between pressure and the power required to keep the sensor wire $R_s$ at constant temperature, the gauge 200 indicates pressure based on a measurement of the bridge voltage $V_{bridge}$, which, as shown in FIG. 1A, is not linearly related to pressure. The combination of a large baseline offset (due to radiative and end losses, for example) with a non-linear response of $V_{bridge}$ on pressure leads to an S-shaped curve that makes calibration difficult and less accurate while interpolating the measurement results.

Figure 4:
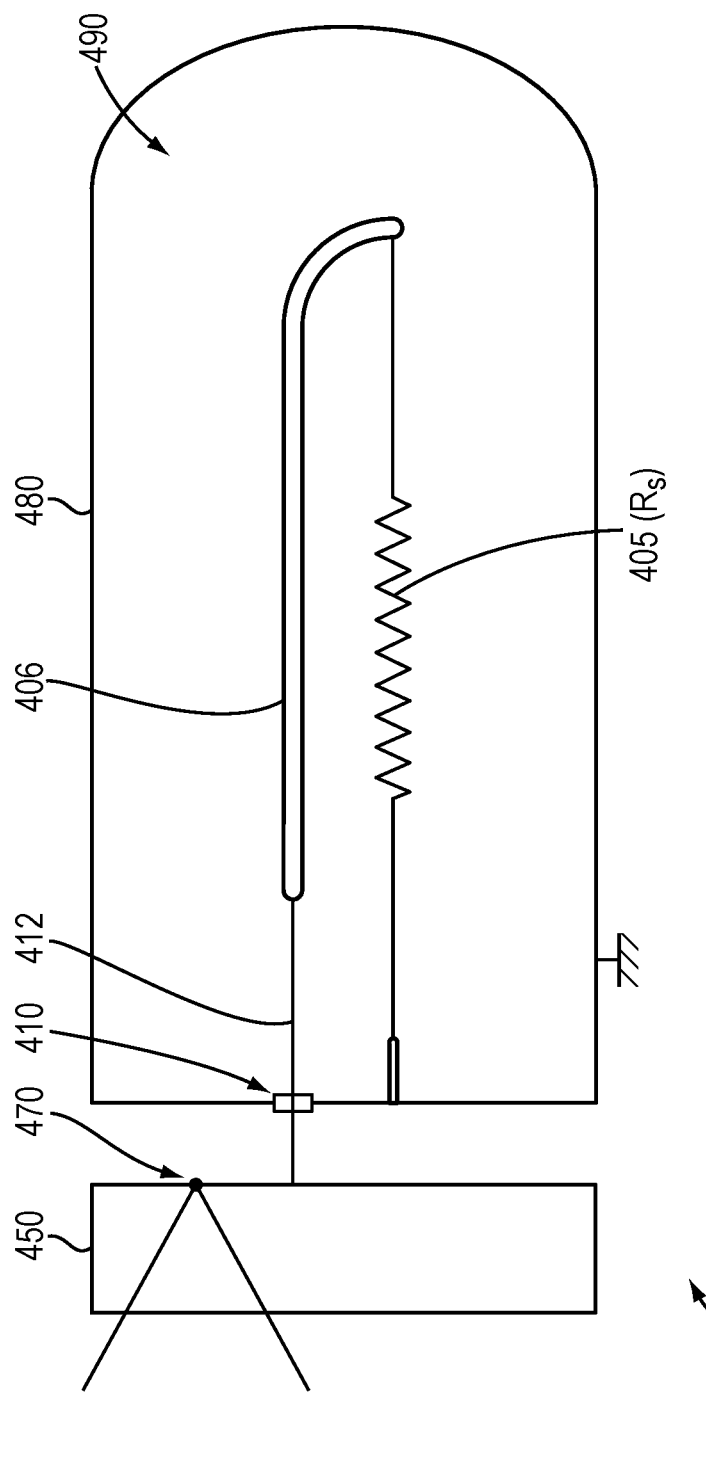
FIG. 4 illustrates a sensor of a thermal conductivity gauge in an example embodiment.

FIG. 4 illustrates a thermal conductivity gauge 400 in an example embodiment, with attention to a sensor portion of the gauge. The gauge 400 includes a sensor wire $R_s$ 405 (also referred to as a filament) fixed within a chamber 490 via a wire mount 406. The wire 405 connects to the gauge circuit 450 (described in further detail below) via a terminal 412 that extends into the chamber 490 through a single feedthrough 410. An opposite node of the wire 405 can be connected to a ground, such as an envelope 480 encompassing the chamber 490. A temperature sensor 470 (e.g., a thermistor) can be positioned at or near the envelope 480 to measure temperature of the envelope 480 and/or ambient temperature outside the chamber 490.

In contrast with the gauge 200 described above with reference to FIGS. 2-3, the gauge 400 provides a sensor having a simpler configuration. The gauge 200 requires only a single feedthrough 410 into the chamber 490. Further, a compensation wire may be omitted from the gauge 400, as temperature compensation can be provided using the temperature sensor 470 in combination with the gauge circuit 450. Thus, the gauge 200 enables a sensor having a simpler, more compact structure that requires less labor to assemble.

The gauge circuit 450 provides further advantages over the gauge 200. The principles on which the gauge circuit 450 operate are described below with reference to FIGS. 5-6.

Figure 5A:
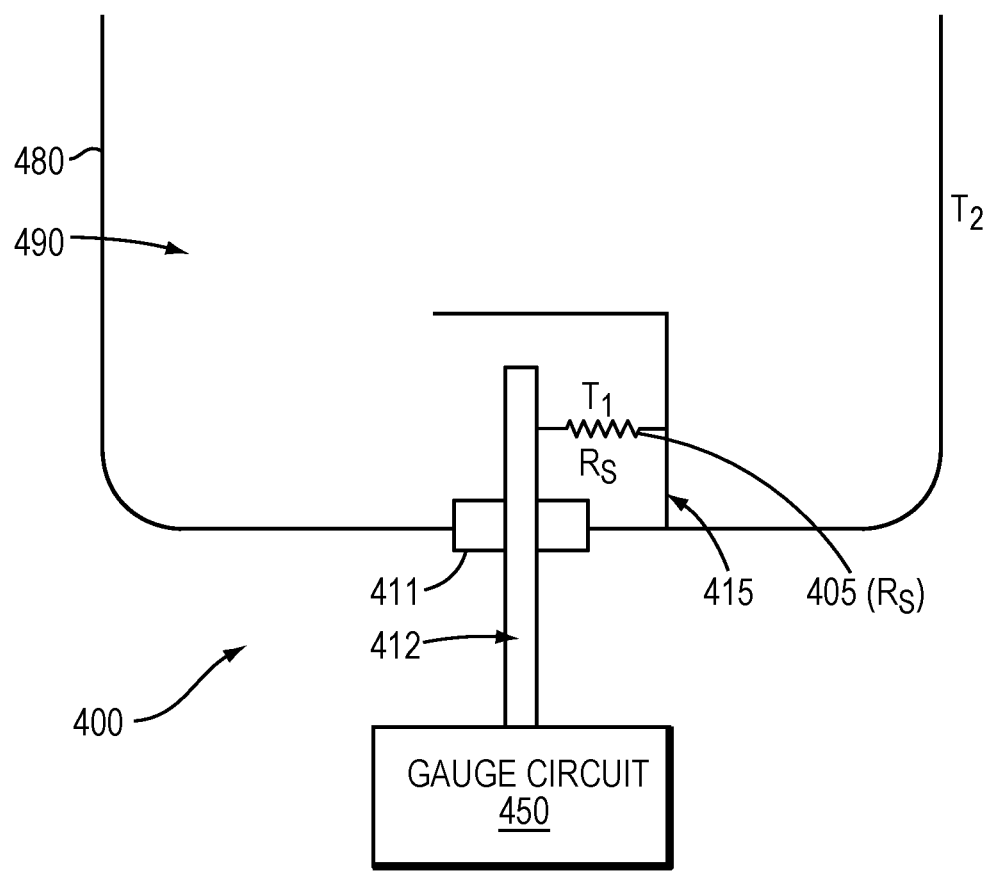
FIG. 5A illustrates the sensor of FIG. 4 in further detail.

FIG. 5A illustrates a portion of the gauge 400 in further detail. Here, the sensor is configured with the optional addition of a shield 415. The sensor wire 405 may be connected between the terminal 412 (embodied as a feedthrough pin) and the shield 415. The shield 415 provides a conductive path to ground, as well as surrounds at least a portion of the sensor wire 405, protecting the sensor wire 405 from physical damage from contaminants from a process environment and providing a thermal boundary condition for the sensor wire 405. The shield 415, when used in combination with a hot cathode gauge, may also serve to shield the sensor wire from the radiation from the hot filament. In such a configuration absent the shield 415, the sensor wire may experience a large change in the baseline radiation offset. An insulator 411 may surround the terminal 412 at the feedthrough 410 to ensure a seal within the chamber 490. The terminal 412 further connects to the gauge circuit 450.

Figure 5B:
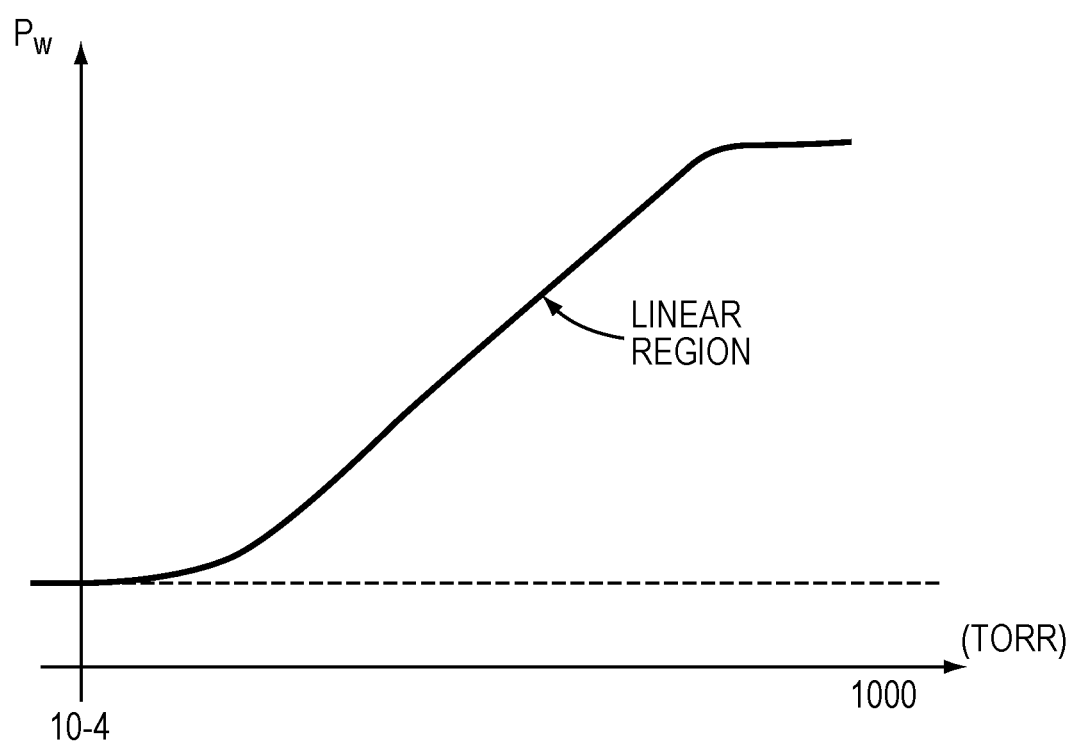
FIG. 5B is a graph illustrating a response of the sensor of FIG. 4.

The sensor wire 405 may be a filament of a small diameter (e.g., 0.001 in. or 0.002 in) and twisted into a coil (e.g., a coil 0.010 in. in diameter diameter). The operational temperature T1 of the sensor wire 405 can be selected to have a target of 20C or more above room temperature to provide adequate sensitivity to pressure changes. The temperature of the sensor wire 405 can be held at a constant value during operation, which can improve the speed of response to changes in pressure. This constant temperature T1 can be achieved by applying a controlled power input (designated Pw to distinguish from pressure P) at the terminal 412 to bring the sensor wire 405 toward a target resistance value. A relation between the resistance and temperature of the sensor wire 405 can be determined for the sensor wire 405 based on previous measurements of the same wire type. This relation can be used for calibrating the gauge 400. As shown in FIG. 5B, the required power input Pw also varies as a function of the pressure of the chamber 490. This function exhibits a linear region in which the pressure can be measured most accurately.

Figure 6:
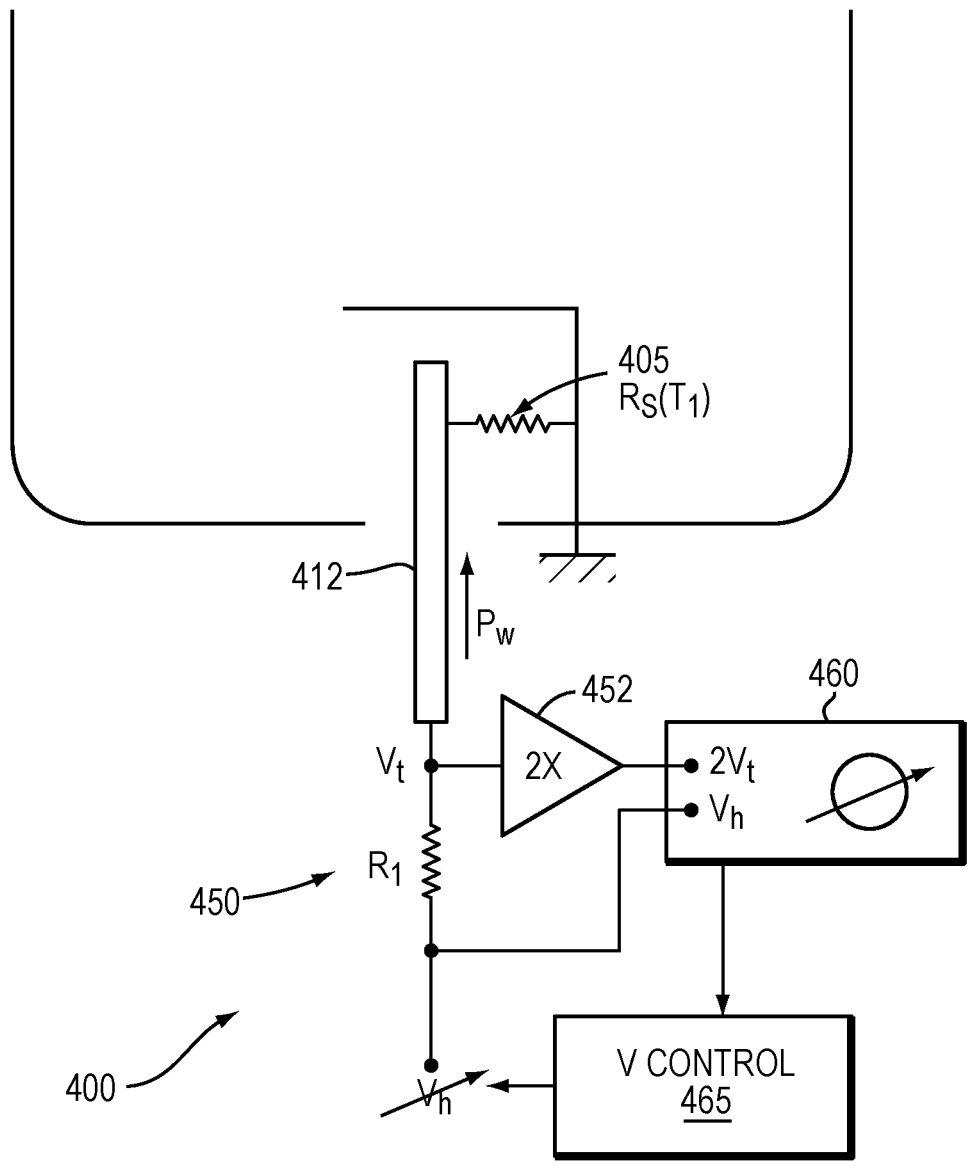
FIG. 6 is a diagram of a thermal conductivity gauge in an example embodiment.

FIG. 6 is a diagram of the gauge 400 with attention to the gauge circuit 450. In view of the relation between the resistance and temperature of the sensor wire 405, the gauge circuit 450 can maintain the sensor wire 405 at temperature $T_1$ during operation. To do so for a selected operational wire temperature $T_1$, the corresponding wire resistance can be calculated based on known calibration curves for the wire type. The resistance of the sensor wire 405 at the selected temperature is thus $R_s(T_1)$.

In order to control the resistance of the sensor wire 405 at different pressures, the gauge circuit 450 can include a resistor $R_1$ connected in series with the sensor wire 405. To simplify analysis, the resistance of $R_1$ can be selected to be equal to the resistance of $R_s$ at the selected temperature $T_1$:

$$R_1 = R_s(T_1) \quad (8)$$

A variable voltage source Vh can be connected to the resistor $R_1$ opposite the terminal 412, and the voltage at the terminal Vt and the voltage source Vh can be compared to determine an adjustment for the voltage source Vh. In one embodiment, the gauge circuit 450 can provide this comparison and adjustment with an amplifier 452, a comparator 460, and a voltage controller 465. The comparator 460 compares the values of 2*Vt (provided by the amplifier 452) and Vh, and outputs a comparison result to the voltage controller 465. The voltage controller 465 then adjusts Vh until 2*Vt is equal to Vh:

$$Vh = 2*Vt \quad (9)$$

When the above condition is met, the resistance of the sensor wire 405 matches the resistance of $R_1$, and the wire is at temperature $T_1$. The electrical Pw power required to heat the sensor wire to temperature $T_1$ is then a function of Vh and $R_1$ as follows:

$$Pw = Vh^2/R_1 \text{ or } Pw = 4Vt^2/R_2 \quad (10)$$

Figure 7A:
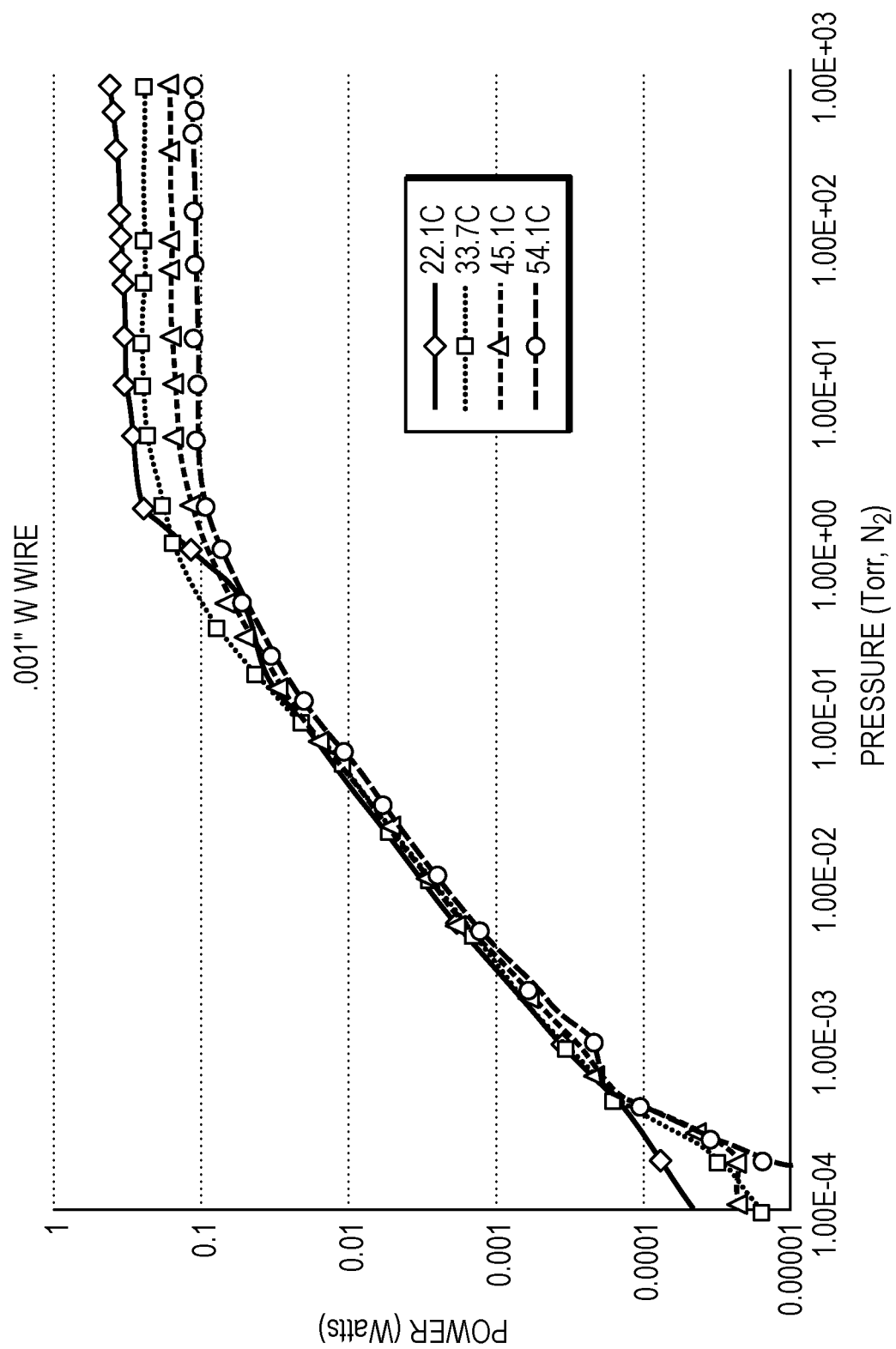
FIGS. 7A-C are graphs illustrating response of the thermal conductivity gauge at different envelope temperatures.
Figure 7B:
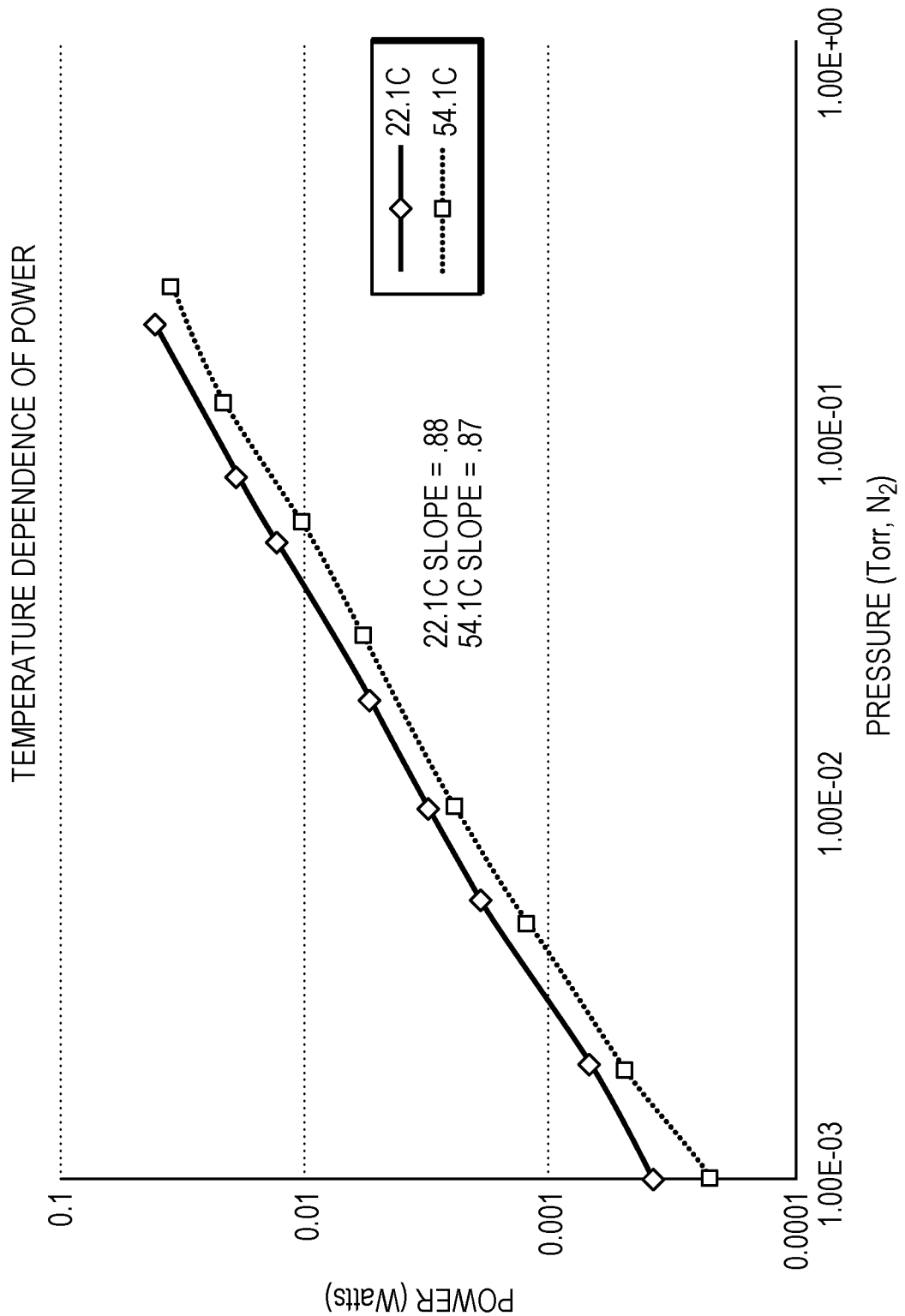

The value Pw at this state can be used to calculate pressure based on an observed relationship between pressure and heating power. In example embodiments, this relationship can be linear over a pressure range extending up to approximately 1 Torr, as illustrated in FIGS. 7A-B, described below. Thus, with the resistor $R_1$ and sensor wire 405 $R_s$ having resistance values selected in accordance with equation (8), the gauge circuit 450 can apply the voltage input Vh to the resistor $R_1$, and adjust the power input Pw as a function of a voltage across the resistor $R_1$ (i.e., Vh and $V_t$) to satisfy equation (9). In doing so, the sensor wire 405 is brought to the target wire temperature $T_1$. A measure of the power input Pw at this state can be determined by equation (10). Comparing the adjusted power input Pw against a known power/pressure relation, a measure of gas pressure within the chamber 490 can thus be determined.

The gauge circuit 450 presents one solution for adjusting the temperature of the wire to T1, which ensures that the resistance of the sensor wire 405 matches that of resistor $R_1$ regardless of the gas pressure exposed to the wire. The comparator 460 and voltage controller 465 provide a feedback loop to measure the differential between Vh and 2*Vt and adjust Vh until the difference is zero and $R_1$-Rs($T_1$). The comparator 460, amplifier 452 and voltage controller 465, or other circuitry providing comparable operation, may be implemented in analog and/or digital circuitry.

FIG. 7A is illustrates a response of an example 0.001 in diameter sensor wire implemented in a thermal conductivity gauge such as the gauge 400. The log-log plot shows the change in power response to pressure within a chamber as a function of temperature of the envelop housing the chamber. The plot includes four curves, where each curve corresponds to the same wire temperature (100C) but different envelope temperatures. As shown, the four curves share a common range of pressure (approximately 1E-3 Torr to 1 Torr) where the relation between power input and pressure are substantially linear.

FIG. 7B illustrates the response of the 0.001 in diameter sensor wire in further detail. Here, the linear range of the lowest and highest envelope temperatures (22C and 54C) is shown in isolation. This plot demonstrates how the linear range of the curves is affected by envelope temperature, where a higher envelope temperature corresponds to a lower power input at a given pressure. Both plots can be matched closely with a linear trend estimation as shown. Thus, the power input Pw required to heat the sensor wire 405 to temperature T1 is a function of the temperature difference $T_1$-$T_2$.

Figure 7C:
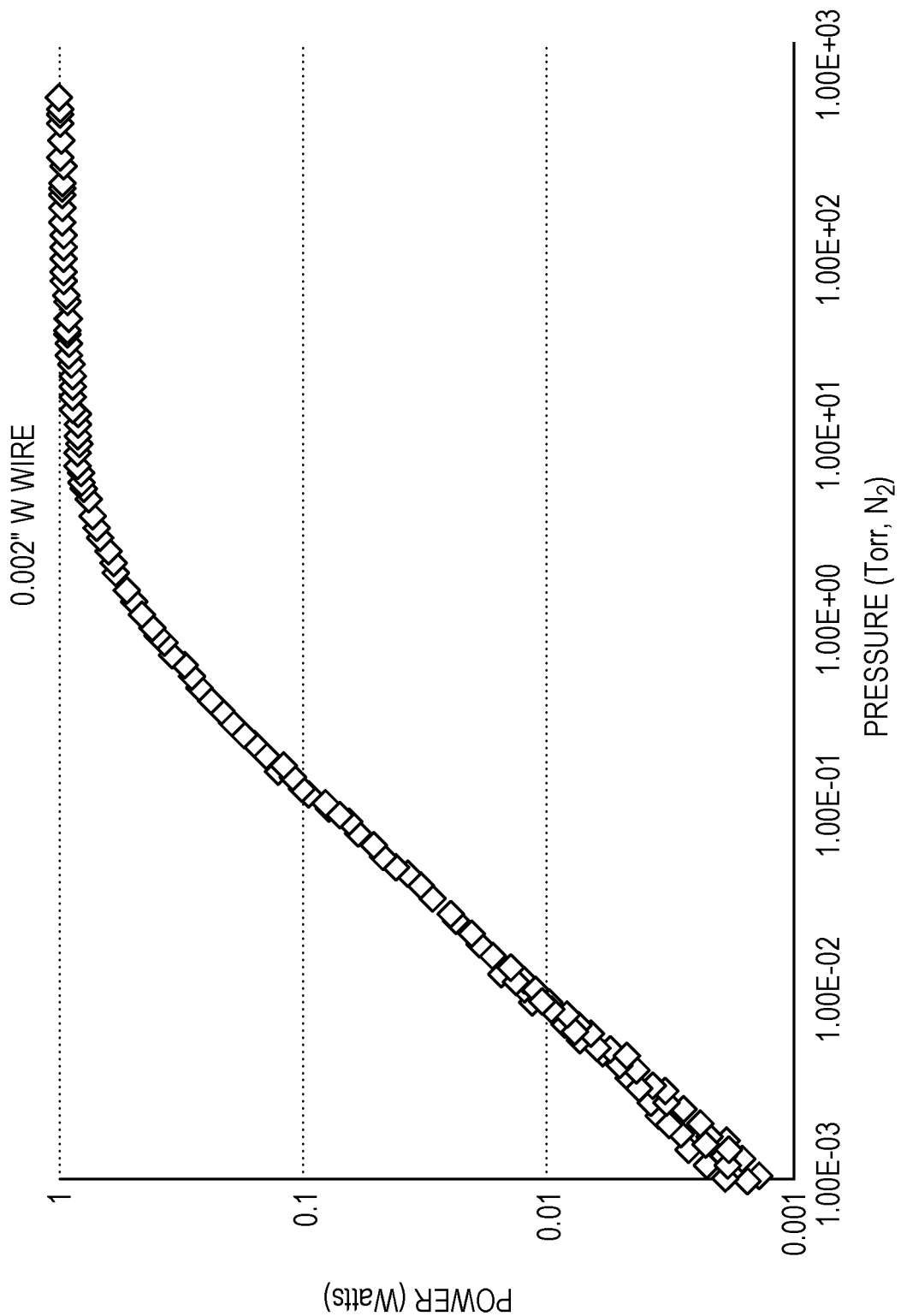

FIG. 7C illustrates a response of an example 0.002 in diameter sensor wire. In contrast to the 0.001 in diameter wire described above, the 0.002 in diameter wire exhibits higher power dissipation, thereby requiring a higher power input. However, the thicker wire also provides a response usable for determining pressure, and may confer advantages during installation and operation due to its higher durability. The sensor wire may be composed of one or more different materials based on the application and working environment of the gauge. For example, a sensor wire made of nickel may be advantageous for use in reactive environments, a tungsten sensor wire may have higher durability, and a platinum sensor wire may be suitable when lower emissivity is desired.

The results shown in FIGS. 7A-C can be used to provide for envelope temperature compensation of pressure measurements in a thermal conductivity gauge. For example, with reference to FIG. 4, the sensor wire 405 exhibits a response comparable to the response illustrated in FIGS. 7A-C. The response may be determined based on measuring the sensor wire itself or may be defined from the wire type. A data set corresponding to this response may be collected and compiled into a lookup table cross-referencing power input, pressure, and envelope temperature. When the gauge 400 operates as described above, the resulting power input Pw, along with a measure of the envelop temperature detected by the thermal sensor 470, can be applied to the lookup table to determine the pressure of the chamber 490. Alternatively, the wire response may be used to derive an equation relating the power input, pressure, and envelope temperature, such as an expression for the linear trend estimation shown in FIG. 7B. Thus, by applying data for power input versus pressure across different envelope temperatures, such as the data shown in FIGS. 7A-C, a measure of power input at a gauge can be used to determine chamber pressure in a manner that compensates for different temperatures of the envelope. In contrast to the gauge 200 described above, which requires controlling the temperature difference between ambient and sensor temperatures, the gauge 400 measures the ambient or envelop temperature $T_2$ independently (e.g., via the thermal sensor 470), and uses this temperature data to interpret the power measurement when determining pressure.

Figure 8A:
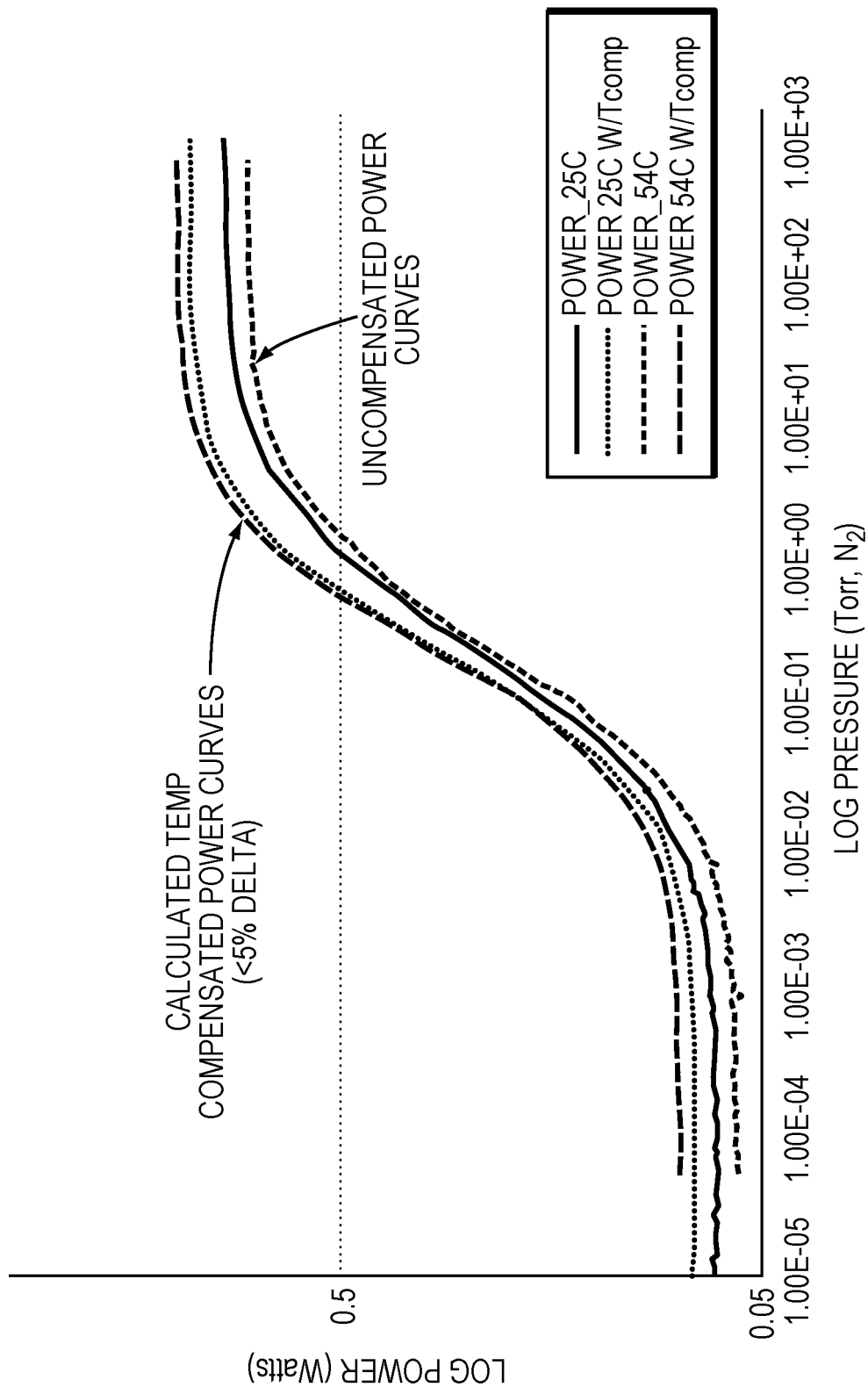
FIGS. 8A-D are plots illustrating response of the gauge implementing temperature compensation.

FIG. 8A illustrates a response of a thermal conductivity gauge with and without temperature compensation. Similar to the plots of FIGS. 7A-B, the power response of a given sensor wire at two different envelope temperatures (25C and 54C) is shown. Additionally, temperature-compensated versions of the power response are shown, which exhibit a nearly identical curve. Thus, as a result of the temperature compensation, the power input applied to the sensor wire can be used to determine the pressure accurately across a range of different envelope temperatures.

Figure 8B:
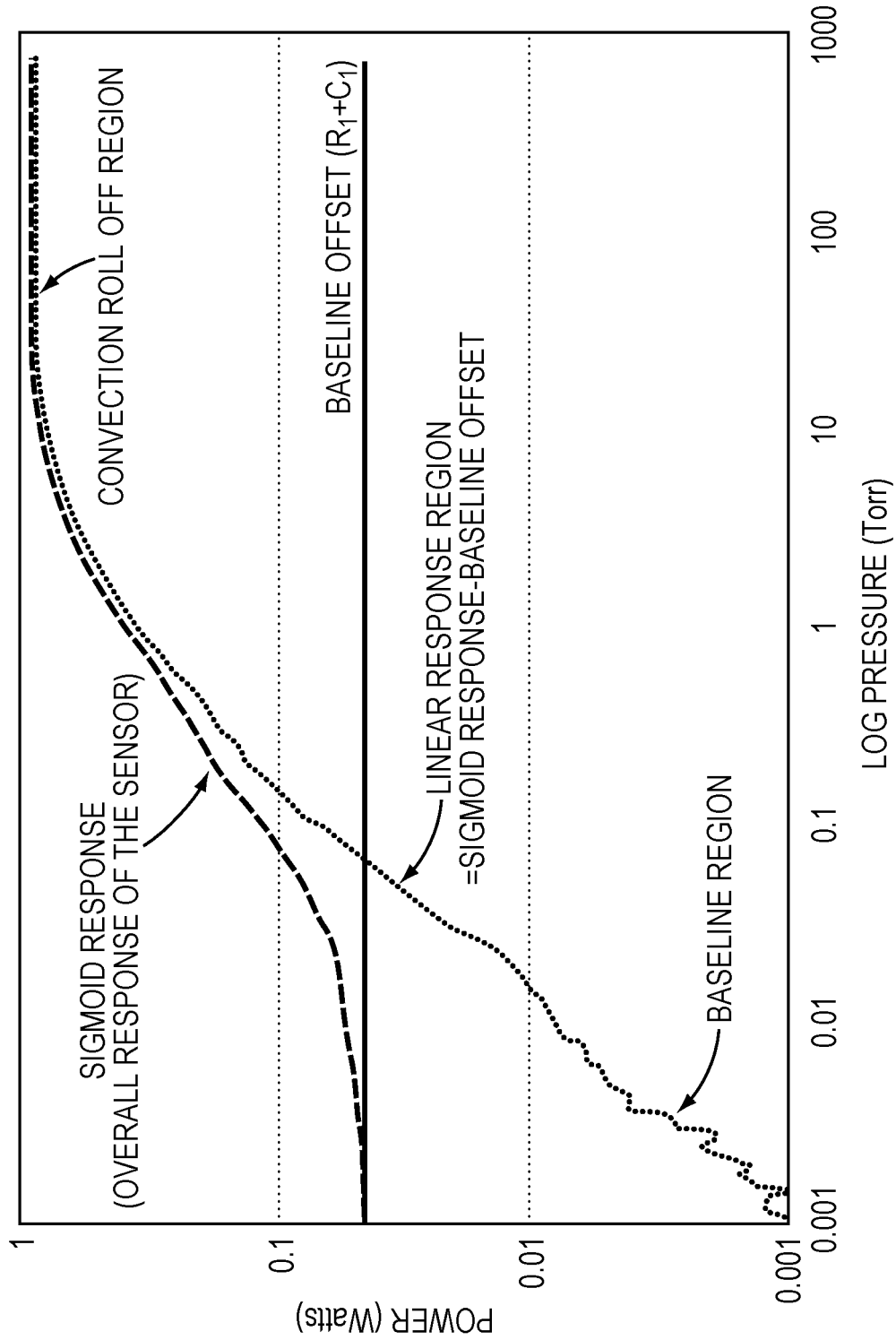

An approach for calculating a temperature-compensated power value is as follows:

An uncompensated plot of power input and pressure, as shown in FIG. 8B (e.g., based on a direct sensor signal response), can be divided into three sections 1) baseline at high vacuum (at left), 2) linear response (Log, Log) (at center), and 3) Convection response (~10 torr to ATM) (at right). The baseline response is made up of two loss mechanism that are constant over the entire pressure range: 1) $R_L$, Radiation loss, and 2) $C_L$, Convective end loss. Thus, the total baseline loss can be expressed as:

Total baseline loss=$R_L+C_L$, where
a) Radiation loss $R_L=\varepsilon\sigma(T^4_{wire}-T^4_{case})$, where $\varepsilon$=emissivity, $\sigma$=Boltzmann's constant
b) Convective loss $C_L=G\pi r^2(T_{wire}-T_{case})/L$, where G=thermal conductivity of wire, r=radius of wire, L=length of wire In the linear response region, $L_R$=KP, (Log $L_R$=logK+P), which is nearly temperature independent (T/sqrt(T)).

In the convection region, hot sheaths of gas inhibit thermal transfer, and the response flattens out. Yet the response also has a $\Delta T$ and like $\Delta T^4$ dependence and can be modeled. The temperature coefficient of the baseline loss regions can be corrected with an equation that has the delta T and delta T to the fourth terms:

Delta T Power Baseline=$(c+d\Delta T+e\Delta T4)$; where c, d and e can be determined from thermal cycling and fitting population.

The entire sigmoid response function can be modeled as a logistics-type sigmoid function, thereby enabling the device to be temperature-compensated with the known physics of the regions:
a) Logistics sigmoid function=$1/(1+e^{-x})$, replacing the $e^{-x}$ term with the physics of the device.
b) Linear region=KP K=constant, P=pressure
c) Boundary conditions:
  i. a=atmospheric power level
  ii. b=baseline offset power level $$\text{Calculated Power} = \frac{a}{1+\frac{1}{KP}} - b \qquad \text{d)}$$

Expressing the atmospheric and baseline power levels as a function of temperature provides the following:
a) $a(T)=a(\text{Tnominal})+(c+d\Delta T+e\Delta T4)$
b) $b(T)=b(\text{Tnominal})+(f+g\Delta T+h\Delta T4)$ $$\text{Temperature-compensated Calculated Power} = \frac{a(T)}{1+\frac{1}{KP}} - b(T); \qquad \text{c)}$$

Based on the above equations, an equation to calculate pressure from measured power can be expressed as follows:

Pressure $(T)=(a(T)/K)/(1/(\text{power}-b(T))-1)$

Figure 8C:
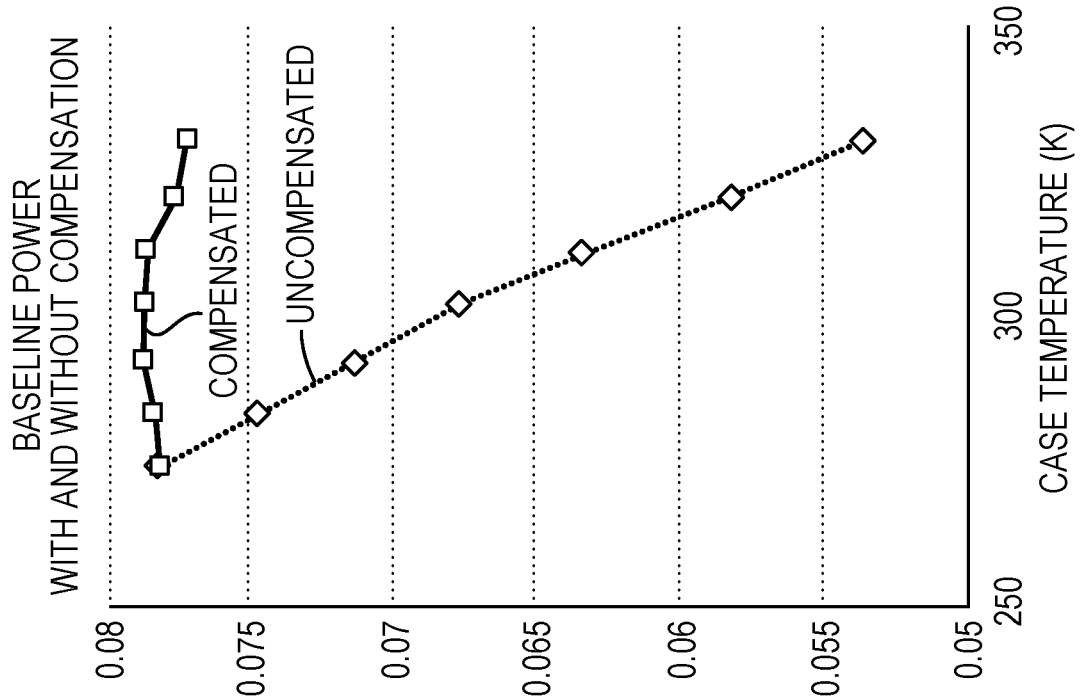
Figure 8D:
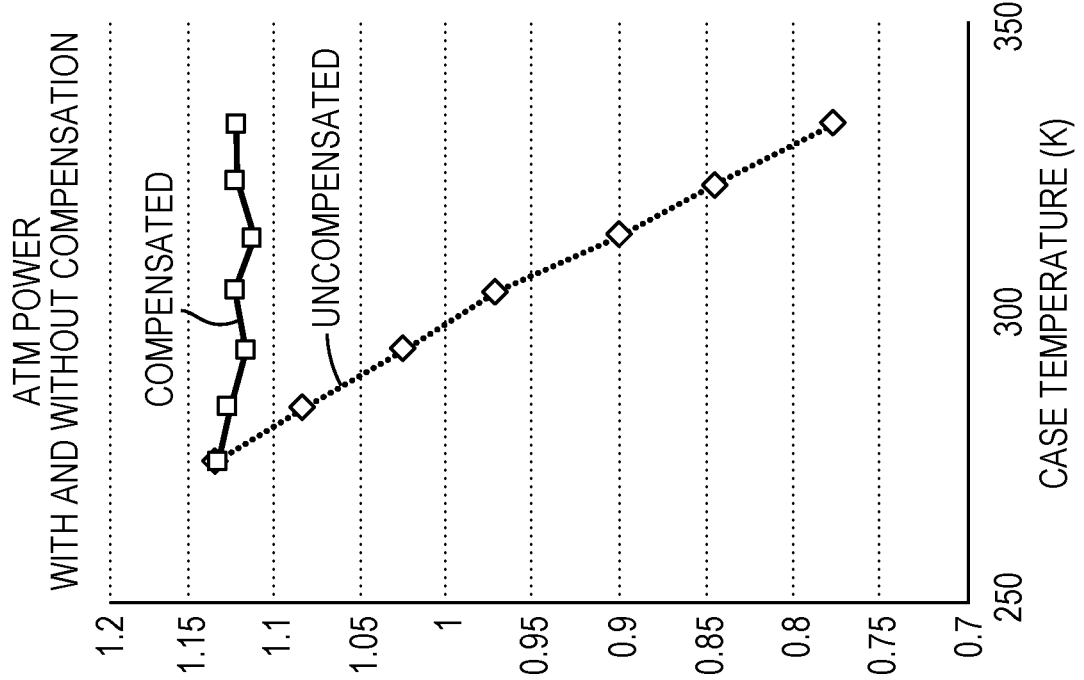

To calibrate a gauge to provide accurate parameters in the equation above, the power may be measured at atmosphere and baseline at a nominal pressure. A plot of example temperature-compensated power curves, utilizing the above equations, is shown in FIG. 8A. Here, a pair of temperature-compensated power curves is compared against a pair of uncompensated power curves for the same temperatures (25C and 54C). FIG. 8C illustrates a comparison between a single power curve, temperature-compensated and uncompensated, within a high-pressure convection region. Similarly, FIG. 8D illustrates a comparison between a single power curve, temperature-compensated and uncompensated, within a high-vacuum baseline region.

Figure 9A:
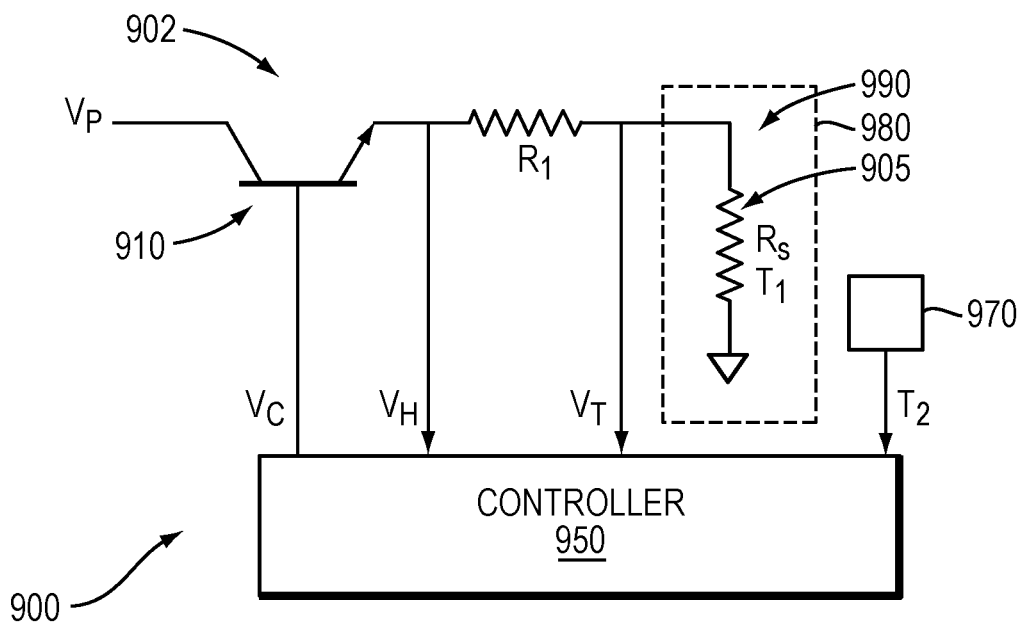
FIG. 9A is a diagram of a thermal conductivity gauge in a further embodiment.

FIG. 9A is a diagram of a thermal conductivity gauge 900 in a further embodiment. The gauge 900 may incorporate one or more features of the gauge 400 described above. A circuit 902 includes a transistor 910, a resistor $R_1$, and a sensor wire 905 ($R_s$) connected in series between a voltage source $V_p$ and ground. The circuit 902 extends, in part, into a chamber 990, where the sensor wire 905 may be configured as described above with reference to FIG. 4. A thermal sensor 970 (e.g., a thermistor) detects the temperature $T_2$ of an envelope 980 encompassing the chamber 980.

A controller 950 may be configured to receive a measure of voltages $V_H$ and $V_T$ opposite the resistor $R_1$, as well as an indication of the temperature $T_2$ from the thermal sensor 970, and outputs a control signal $V_c$ to control current through the transistor 910. The controller 950 may incorporate features of the gauge circuit 450 described above, and may be implemented in analog and/or digital circuitry. For example, the controller 950 may include an analog-to-digital converter (ADC) for converting $V_H$, $V_T$ and $T_2$, to digital values; a proportional-integral-derivative controller (PID) controller for determining the control voltage $V_c$ based on the digital values; and a digital-to-analog converter (DAC) for generating the control voltage $V_c$ to the transistor 910.

Prior to operation, the gauge 900 may be configured comparably to the gauge 400 described above. Further, the resistance value of resistor $R_1$ may be selected based on the room-temperature resistance of the sensor wire 905, where the room-temperature resistance can be used to calculate the resistance of $R_1$ required to maintain the operational temperature $T_1$ of the sensor wire, where "tempco" is a temperature coefficient that indicates the change in resistance with temperature:

$$R_1=R_s(\text{room temperature})+T_1*\text{tempco}*R_s(\text{room temperature}) \text{ (or } R_1=R_s(\text{room temperature})(1+T_1*\text{tempco}) \qquad (11)$$

In operation, the controller 950 can maintain the sensor wire 905 at temperature $T_1$ by adjusting the control voltage $V_c$, thereby controlling the power input at the resistor $R_1$. The controller 950 can determine adjustment to the control voltage $V_c$ through a process comparable to the process for determining voltage Vh described above with reference to FIG. 6. In particular, the voltages VT and VH can be compared to determine an adjustment for the voltage source provided by the transistor 910. The controller 950 adjusts $V_c$ until $2*V_T$ is equal to $V_H$. When this condition is met, the resistance of the sensor wire 905 matches the resistance of $R_1$, and the wire is at temperature $T_1$. The electrical power Pw required to heat the sensor wire to temperature $T_1$ is then a function of $V_H$ and $R_1$ as described above in equation (10). The power input Pw at this state can be used to calculate pressure based on an observed relationship between pressure and heating power as illustrated in FIGS. 7A-B and 8. Thus, with the resistor $R_1$ and sensor wire 905 $R_s$ having resistance values selected in accordance with equation (8), the controller 950 can apply the power input Pw to the resistor $R_1$, and adjust the power input Pw as a function of a voltage across the resistor $R_1$ (i.e., Vh and $V_t$) to satisfy equation (9). In doing so, the sensor wire 405 is brought to the target wire temperature $T_1$. A measure of the power input Pw at this state can be determined by equation (10). Comparing the adjusted power input Pw against a known power/pressure relation, a measure of gas pressure within the chamber 990 can thus be determined. The controller 950 may output an indication of Pw to enable this determination, or may be configured to determinate pressure via a lookup table or further calculation, thereby outputting a pressure value. In doing so, the controller 950 may also use the envelope temperature $T_2$ to determine a temperature-compensated pressure value as described above.

The controller 950 provides a digital control loop that enables the gauge 900 to be configured to operate with a desired wire temperature in a range of possible temperatures. By changing the multiplication factor between Vt and Vh, a target wire temperature can be selected as follows:

Vh=xVt where x is a multiplication factor

To derive x:

At Tnominal (room temperature), R1=Rs (R1 connected in series with the sensor wire Rs). At any other temperature, the temperature coefficient of the wire can be used to calculate Rs(T):

Rs(T)=(1+$\alpha$*(Tset−Tnominal))Rs, (where $\alpha$ is the temperature coefficient of the wire type to be used)

The relationship between Vh and Vt can be expressed as a simple resistive divider equation:

Vt=[R1/(R1+Rs(T))]Vh

Inserting Rs(T):

Vt=[R1/(R1+(1+$\alpha$*(Tset−Tnominal))Rs)]Vh (using R1=Rs)

Vt=[R1/(R1+(1+$\alpha$*(Tset−Tnominal))R1)]Vh

Vt=[R1/(R1*(1+(1+$\alpha$*(Tset−Tnominal))))]Vh

Vt=[1/((1+(1+$\alpha$*(Tset−Tnominal))))]Vh

Vt=[1/((2+$\alpha$*(Tset−Tnominal)))]Vh

Vh=(2+$\alpha$*(Tset−Tnominal))*Vt

Vh=x*Vt x=(2+$\alpha$*(Tset−Tnominal))

(2+$\alpha$*(Tset−Tnominal)) is the multiplication factor (x) in the digital loop that can be applied to change the temperature of the wire depending on the customers' requirements and process.

Example values that may be implemented in the calculations above are as follow:

$\alpha$=0.0048 (TC for tungsten)

Tset=100, Tnominal=75

Vh=2.36*Vt; x=2.36

Tset=125 Tnominal=25

Vh=2.48*Vt; x=2.48

Thus, using a calculated multiplication factor x, the wire temperature can be configured for a given application of the gauge 900 without changing the values of resistors $R_1$ or $R_s$.

Figure 9B:
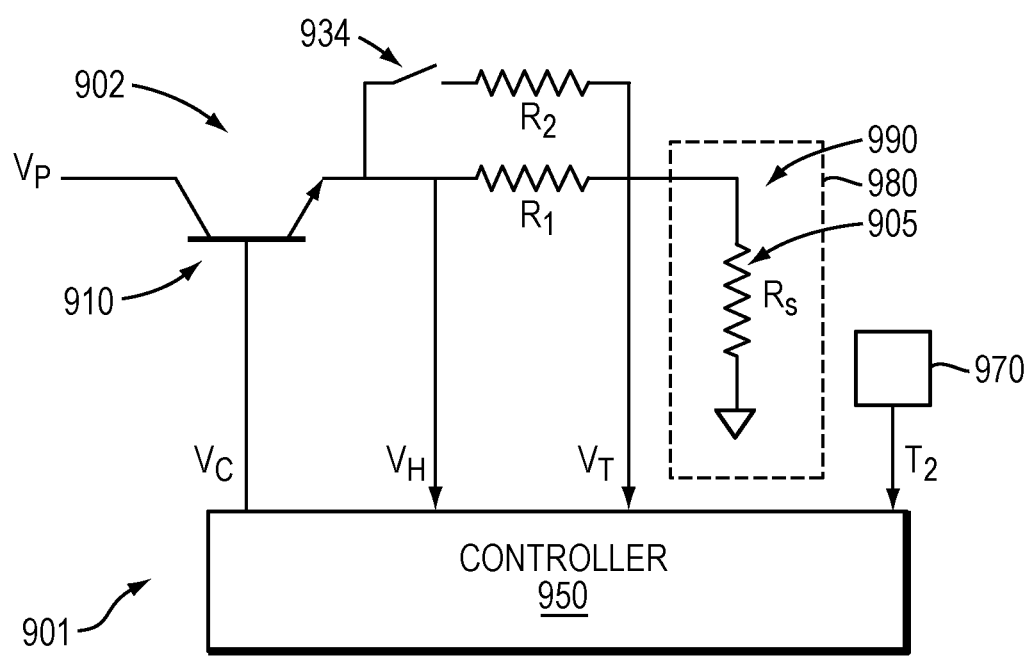
FIG. 9B is a diagram of a thermal conductivity gauge in a still further embodiment.

FIG. 9B is a diagram of a thermal conductivity gauge 901 in a further embodiment. The gauge 901 may include the features of the gauge 900 of FIG. 9A, with the addition of a resistor $R_2$ that can be selectively connected in parallel with the resistor $R_1$ via a switch 934. The switch may be controlled by the controller 950 or may be manually configured. In alternative embodiments, one or more additional resistors may be selectively connected in series with, or in parallel with, the resistor $R_1$. The resistor $R_1$ may also be replaced with a variable resistor.

Further, the temperature of the wire can be adjusted by using a variable multiplication factor. For example, R1=Rs may be set at ambient temperature. When the wire is at the desired temperature (Vh=2*Vt), the multiplication factor x can be used to adjust the temperature such that Vh=x*Vt, where x=(2+tempco*(Ttarget−Tambient)). Under such an implementation, only the ambient resistances of the sensor (Rs) must be matched to R1.

Figure 10A:
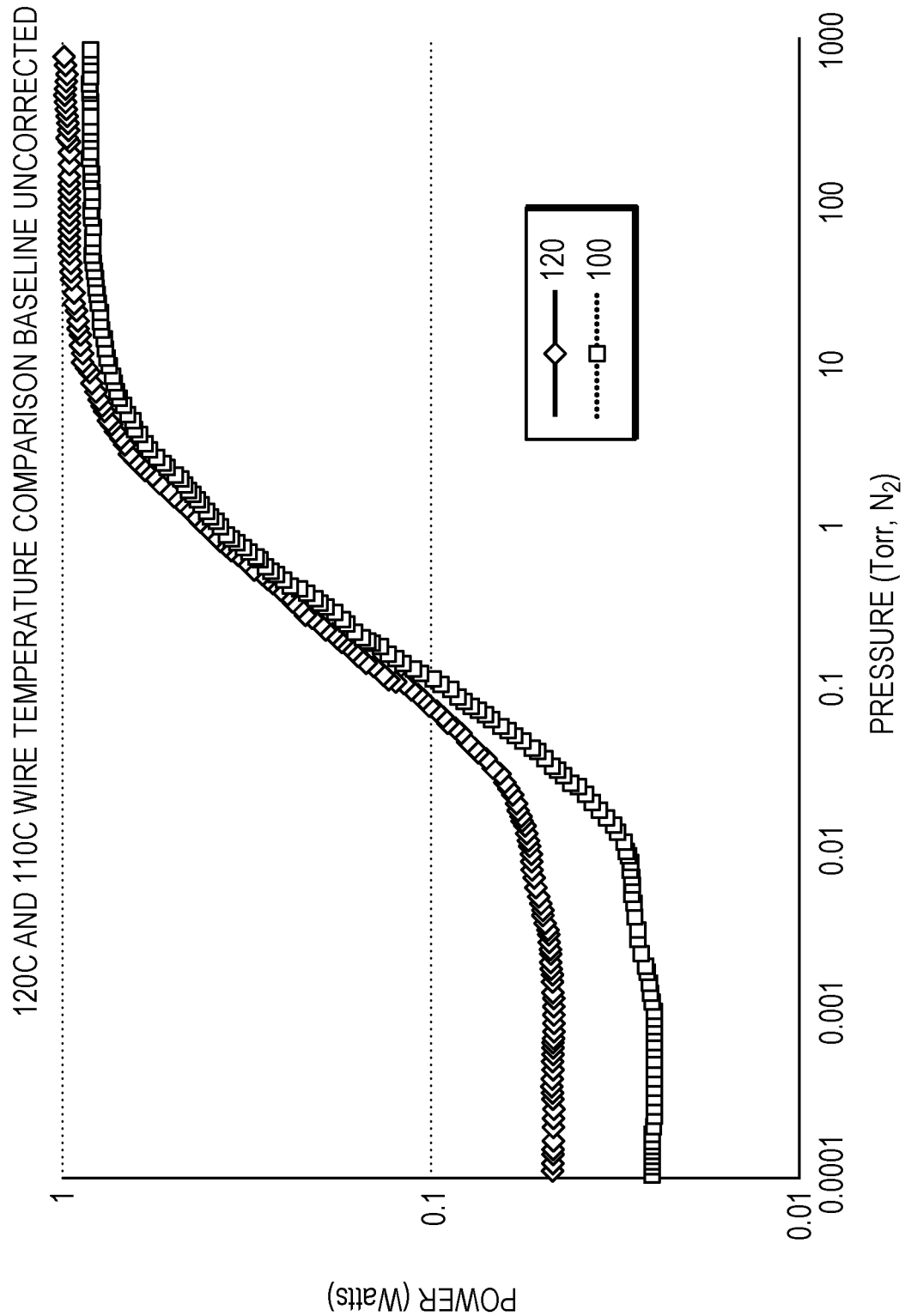
FIGS. 10A-B illustrate response of a thermal conductivity gauge with and without baseline correction.
Figure 10B:
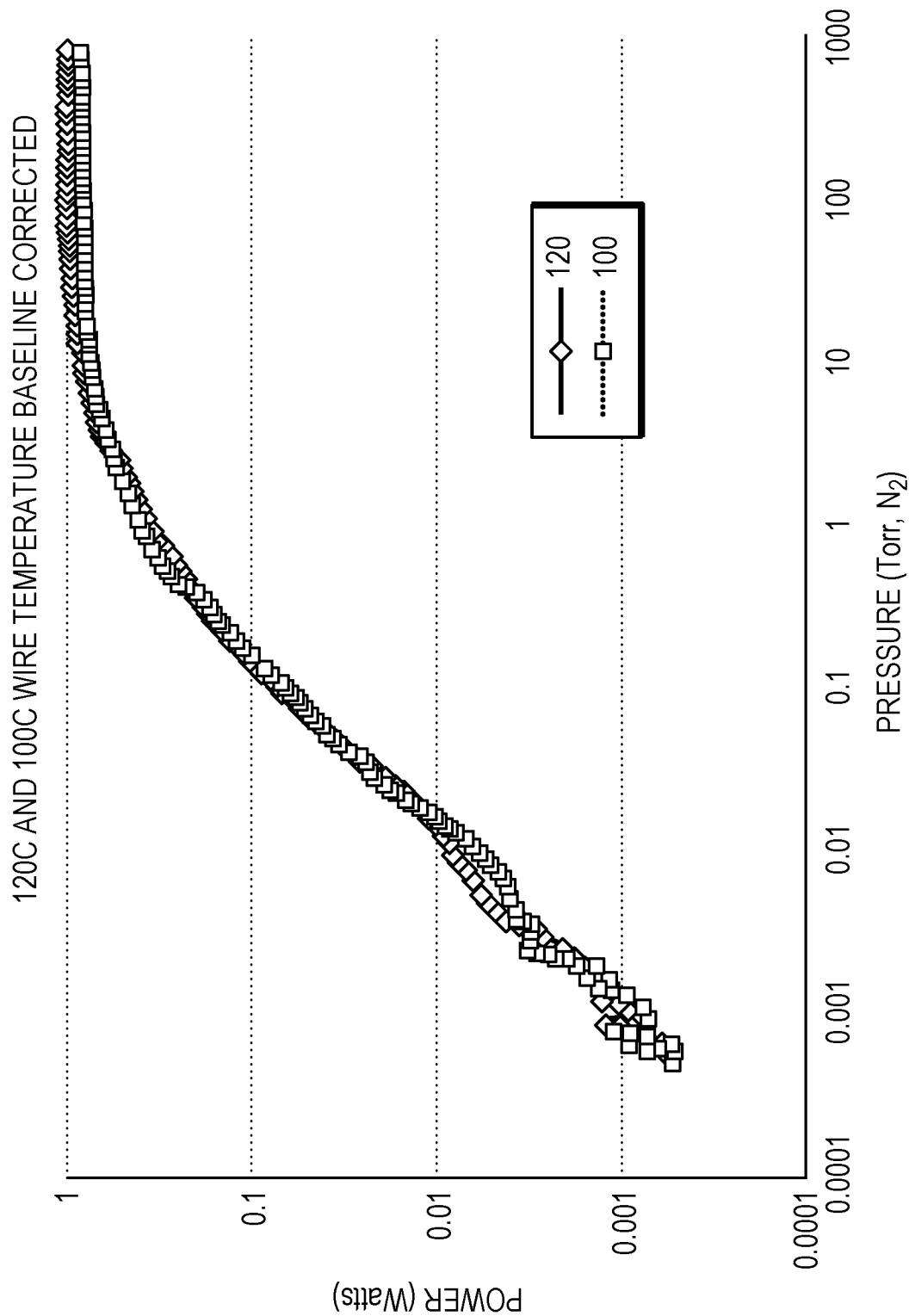

In some applications, an adjustable resistance provided by the gauge 901 may be advantageous. For example, the gauge 901 may be used in multiple settings requiring different operational temperatures of the sensor wire 905. FIG. 10A illustrates one such application, where the power response of the sensor wire 905 over pressure is shown for two different operational temperatures $T_1$ (100C and 120C) of the sensor wire 905. The sensor wire 905 exhibits a lower power response at 100C than at 120C. To correct for this difference, as shown for example in FIG. 10B, the values of resistors R1 and R2 may be selected such that (1) the resistor R1, absent R2, exhibits a target response from the sensor wire 905 when T1 is at a first operational temperature (e.g., 100C); and (2) the total resistance of R1 and R2 connected in parallel exhibits a comparable response from the sensor wire 905 when T1 is at a second operational temperature (e.g., 120C). As a result, the gauge 901 can provide for operation at different values of T1 while achieving a comparable response for determining pressure.

Figure 11:
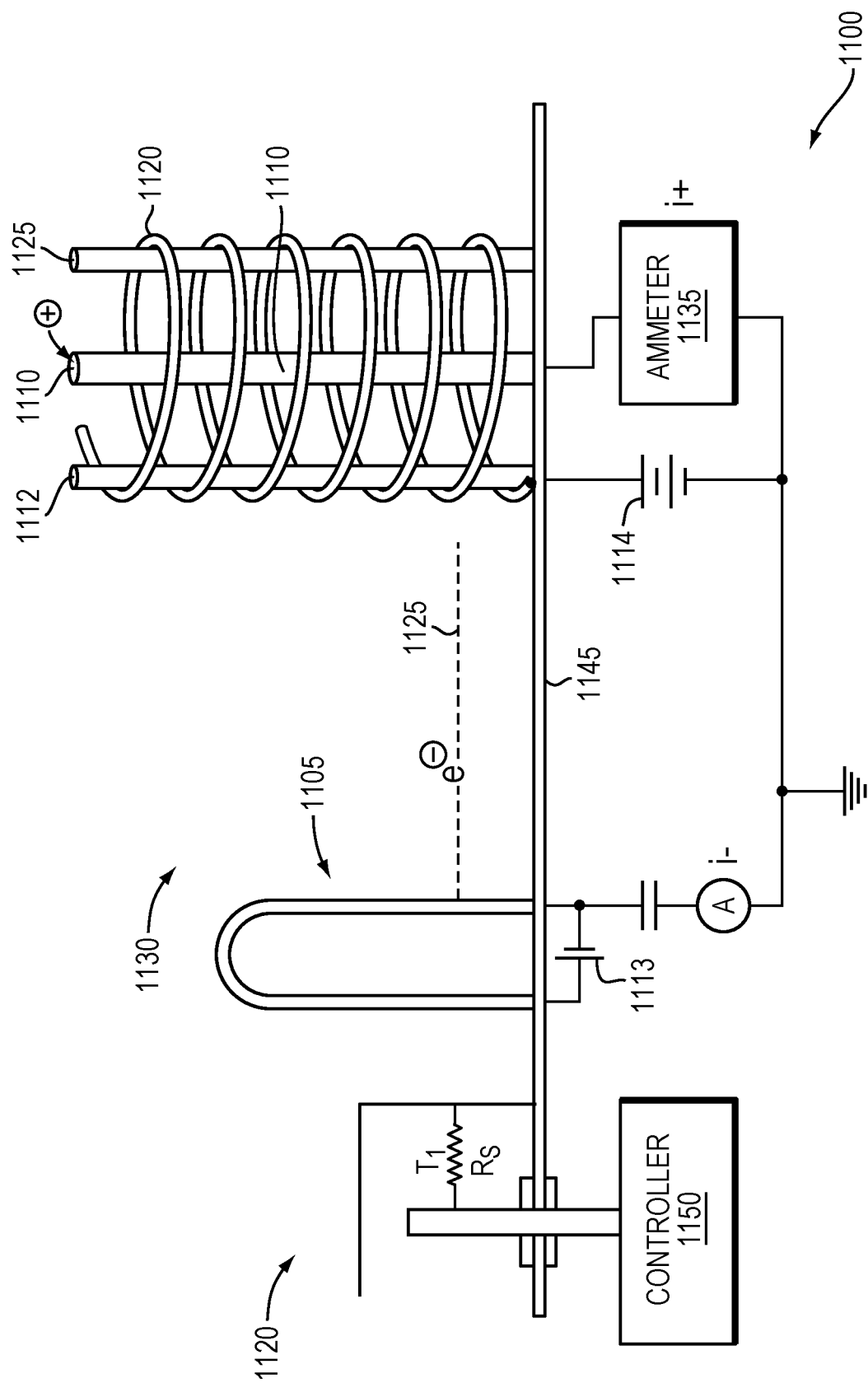
FIG. 11 illustrates an assembly including a thermal conductivity gauge implemented in combination with a hot cathode ion gauge.

FIG. 11 illustrates an assembly 1100 including a thermal conductivity gauge 1120 implemented in combination with an ion gauge 1130. The ion gauge 1130 includes an electron source 1105, an anode 1120, and an ion collector electrode 1110. The electron source 1105 (e.g., a hot cathode) is located outside of an ionization space or anode volume. The anode structure includes a cylindrical wire grid 120 around posts 112 and 114, defining the ionization space in which electrons 1125 impact gas molecules and atoms. The ion collector electrode 1110 is disposed within the anode volume. Electrons travel from the electron source 1105 to and through the anode, cycle back and forth through the anode 1120, and are consequently retained within, or nearby to, the anode 1120. Further embodiments may utilize an ion gauge having a cold cathode electron source.

In their travel, the electrons 1125 collide with molecules and atoms of gas that constitute the atmosphere whose pressure is desired to be measured. This contact between the electrons and the gas creates ions. The ions are attracted to the ion collector electrode 1110, which is connected to an ammeter 1135 to detect current from the electrode 1110. Based on a measurement by an ammeter 1135, the pressure of the gas within the atmosphere can be calculated from ion and electron currents by the formula P=(1/S) ($I_{ion}/I_{electron}$), where S is a coefficient with the units of 1/Torr and is characteristic of a particular gauge geometry, electrical parameters, and pressure range.

The gauge 1120 may be configured as described above with reference to FIGS. 4-10. Due to the low pressures at which a typical ion gauge operates, the assembly 1100 benefits from the thermal conductivity gauge 1120, which can measure higher pressures than the ion gauge 1130. Further, the thermal conductivity gauge 1120, via a controller 1150, may control a switch for the ion gauge 1130, enabling the ion gauge 1130 (e.g., at power sources 1113, 1114) when the measured pressure falls below a given threshold, and disabling the gauge 1130 when the measure pressure rises above a given threshold. As a result, the ion gauge 1130 can be prevented from operating at pressures that may cause damage to it. Conversely, the controller 1150 may receive input from the ion gauge 1130 (e.g., from ammeter 1135), enabling the gauge 1120 when the pressure rises above a threshold and disabling the gauge 1120 when the pressure falls below a threshold.

In response to the heat generated by the ion gauge 1130 during operation, the thermal conductivity gauge 1120 may be further configured to compensate for temperature fluctuations caused by this heat. For example, to the extent that the ion gauge 1120 raises the temperature of the envelope, the thermal conductivity gauge 1120 may compensate for this temperature change as described above with reference to FIGS. 7A-C and 8. This approach may also be applied to temperature changes measured at other points relative to the ion gauge 1130. For example, a thermal sensor may be implemented at the ion gauge 1130 to measure temperature, and this measured temperature can be correlated to the power response of the thermal conductivity gauge 1120 to determine a compensation factor based on heat generated by the ion gauge, thereby enabling the gauge 1120 to determine the measure of gas pressure as a function of the compensation factor.

Figure 12:
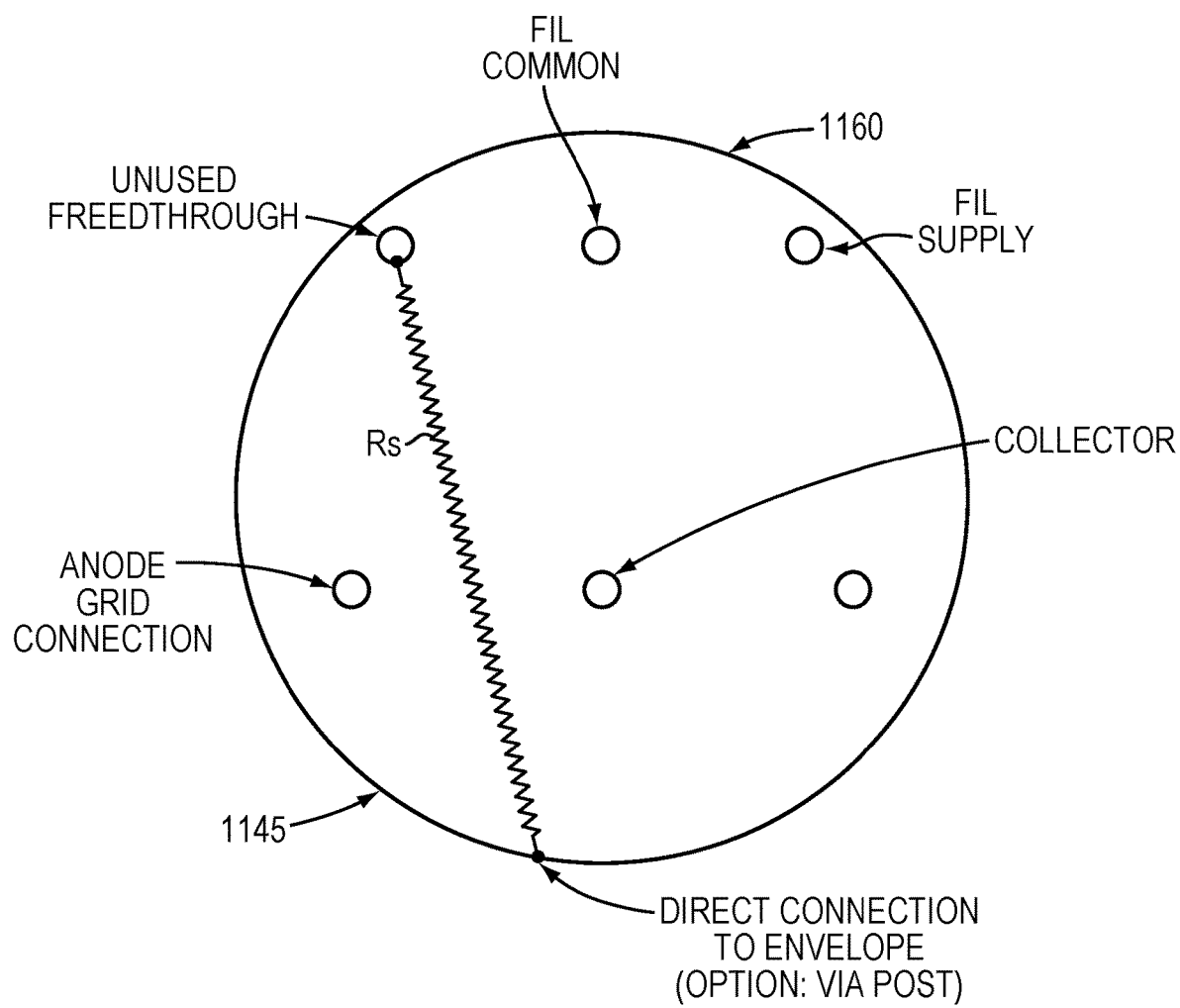
FIG. 12 is a diagram illustrating the feedthroughs implemented by the assembly of FIG. 11.

When implemented in combination, the thermal conductivity gauge 1120 and ion gauge 1130 may be assembled such that feedthroughs of each gauge extend through a common feedthrough flange 1145. An example feedthrough flange 1145 is illustrated in a top-down view, in FIG. 12. The ion gauge 1130 uses several feedthroughs of the flange 1145. In contrast, the thermal conductivity gauge 1120, as configured as described above, requires only a single feedthrough 1160. This single feedthrough 1160 accommodates a feedthrough pin, and the sensor wire $R_s$ is connected between the feedthrough pin and a ground (e.g., the envelope or a post). Because the gauge 1120 only requires a single feedthrough of the flange 1145, and an ion gauge may leave at least one feedthrough unused in an existing assembly, the gauge 1120 may provide a further benefit in that it can be retrofitted into such an existing assembly with minimal alteration to the assembly.

Figure 13A:
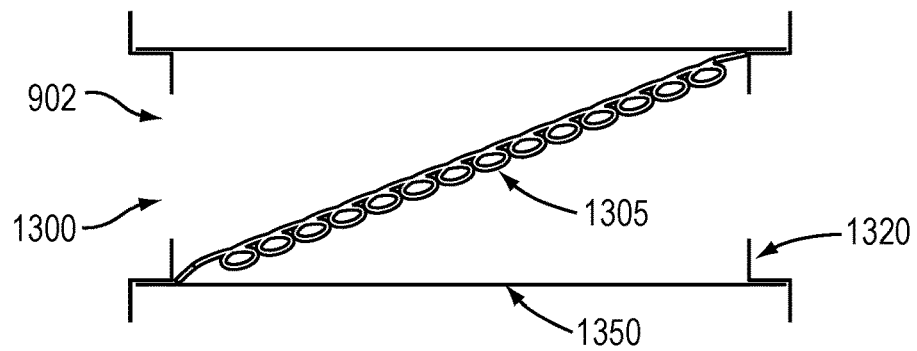
FIGS. 13A-C illustrate a housing supporting a sensor wire for use in a thermal conductivity gauge.
Figure 13B:
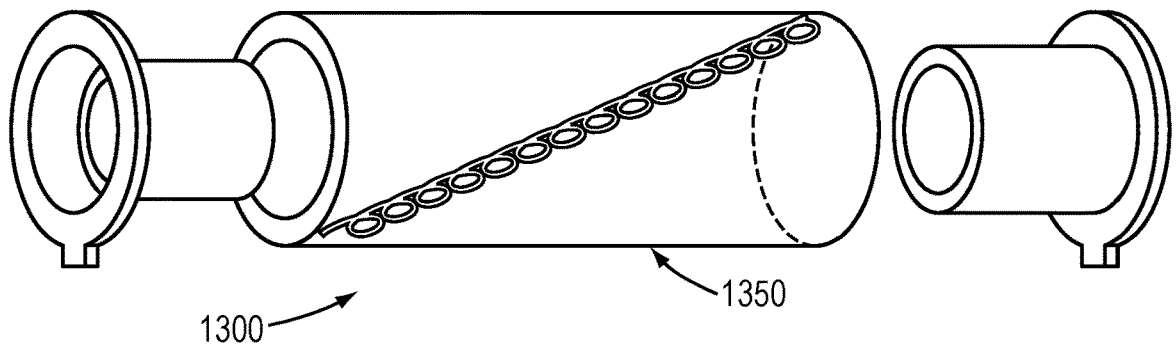
Figure 13C:
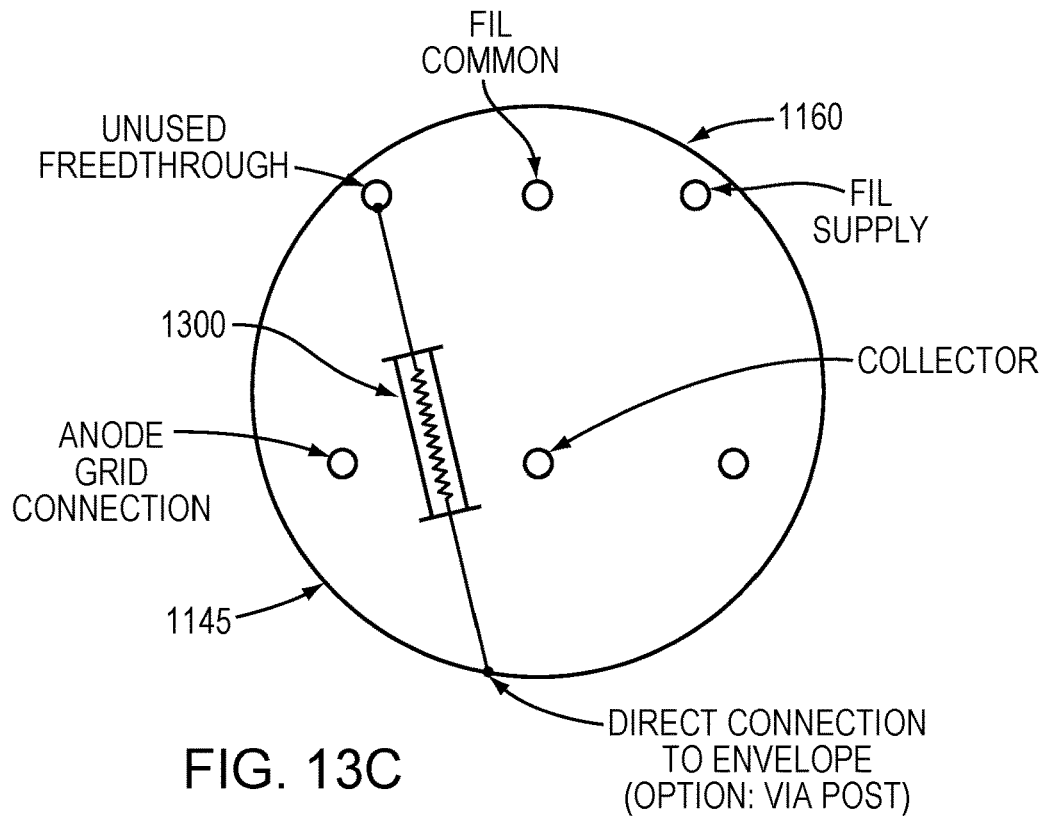

FIGS. 13A-C illustrate a housing 1300 supporting a sensor wire 1305 for use in a thermal conductivity gauge such as the gauges 400, 900 described above. FIG. 13A illustrates a side cross-section of the housing 1300, and FIG. 13B is an perspective view of the housing 1300. The housing 1300 may include conductive end caps 1320 to which the sensor wire 1305 can be connected. The sensor wire may be retained at each end by being compressed between the end caps and a tube 1350, thereby making the electrical connection. The tube 1350 can be of a non-conductive material (e.g., glass or ceramic), and connects the end caps 1320. Depending on a desired level of thermal transfer between the sensor wire 1305 and the chamber, the tube 1350 may be closed or slotted.

FIG. 13C illustrates a top-down view of the housing 1330 as positioned within a chamber. The housing 1300 provides a number of advantages. For example, the rigid structure of the tube 1350 protects the wire from damage during installation and operation. Further, the end caps 1320 may accommodate a bracket or post within the chamber, allowing the housing 1300 to be quickly and easily installed, removed and replaced.

While example embodiments have been particularly shown and described, it will be understood by those skilled in the art that various changes in form and details may be made therein without departing from the scope of the embodiments encompassed by the appended claims.

What is claimed is:

1. A thermal conductivity gauge for measuring gas pressure, comprising:
   a sensor wire within a chamber coupled to a terminal and a grounded envelope encompassing a volume of the chamber;
   a resistor coupled between the terminal and an electrical input receiving a power input; and
   a controller configured to 1) apply the power input to the resistor; 2) adjust the power input to bring the sensor wire to a target temperature; and 3) determine a measure of gas pressure within the chamber based on an adjusted power input at the target temperature.

2. The gauge of claim 1, wherein the resistor and the sensor wire have an equivalent resistance at the target temperature.

3. The gauge of claim 1, wherein the sensor wire is coupled to the envelope via a shield extending through the volume of the chamber.

4. The gauge of claim 1, wherein the controller is further configured to 1) determine a compensation factor based on an envelope temperature external to the chamber and 2) determine the measure of gas pressure as a function of the compensation factor.

5. The gauge of claim 1, wherein the resistor is a first resistor, and further comprising a second resistor and a switch connected in parallel with the first resistor, the controller configured to selectively enable the switch.

6. The gauge of claim 1, wherein the sensor wire is supported within a removable housing extending between the terminal and the ground.

7. The gauge of claim 1, further comprising a temperature sensor configured to measure the temperature of at least one of the grounded envelop and the ambient temperature outside of the chamber.

8. A thermal conductivity gauge for measuring gas pressure, comprising: a sensor wire within a chamber coupled to a terminal and a grounded envelope encompassing a volume of the chamber, the terminal connected to a gauge circuit; and the gauge circuit connected to the terminal, the gauge circuit including: a resistor coupled between the terminal and an electrical input receiving a power input; and a controller configured to 1) apply the power input to the resistor; 2) adjust the power input to bring the sensor wire to a target temperature; and 3) determine a measure of gas pressure within the chamber based on an adjusted power input at the target temperature.

9. The gauge of claim 8, wherein the resistor and the sensor wire have an equivalent resistance at the target temperature.

10. The gauge of claim 8, wherein the terminal comprises a feedthrough pin coupled to the gauge circuit.

11. The gauge of claim 8, wherein the sensor wire is coupled to the envelope via a shield extending through the volume of the chamber.

12. The gauge of claim 8, wherein the shield surrounds at least a portion of the sensor wire.

13. The gauge of claim 8 wherein the shield is coupled to ground.

14. The gauge of claim 8, wherein the controller is further configured to 1) determine a compensation factor based on an envelope temperature external to the chamber and 2) determine the measure of gas pressure as a function of the compensation factor.

15. The gauge of claim 8, wherein the resistor is a first resistor, and further comprising a second resistor and a switch connected in parallel with the first resistor, the controller configured to selectively enable the switch.

16. The gauge of claim 8, further comprising a temperature sensor configured to measure the temperature of at least one of the grounded envelop and the ambient temperature outside of the chamber.

\* \* \* \* \*